United States Patent [19]

Shimotani et al.

[11] Patent Number: 4,833,714
[45] Date of Patent: May 23, 1989

[54] SPEECH RECOGNITION APPARATUS

[75] Inventors: Mitsuo Shimotani; Masahiro Hibino; Kenji Shima, all of Amagasaki, Japan

[73] Assignee: Mitsubishi Denki Kabushiki Kaisha, Tokyo, Japan

[21] Appl. No.: 228,149

[22] Filed: Aug. 4, 1988

Related U.S. Application Data

[63] Continuation-in-part of Ser. No. 645,663, Aug. 30, 1984, abandoned.

[30] Foreign Application Priority Data

Sep. 30, 1983 [JP] Japan ................................ 58-183842
Feb. 10, 1984 [JP] Japan ................................ 59-23285

[51] Int. Cl.$^4$ .............................................. G10L 5/00
[52] U.S. Cl. .......................................... 381/47; 381/43
[58] Field of Search ................................. 381/47, 43

[56] References Cited

U.S. PATENT DOCUMENTS 3,989,897  11/1976  Carver .................................. 381/47
4,538,295  8/1985  Noso et al. ........................... 381/47

Primary Examiner—Emanuel S. Kemeny
Attorney, Agent, or Firm—Lowe, Price, Leblanc, Becker & Shur

[57] ABSTRACT

A word speech recognition apparatus recognizes a speech inputted to a microphone (11). A feature extracting portion (20) extracts a feature parameter based on a aural signal waveform outputted from the microphone. The feature extracting circuit comprises a pitch cycle extraction circuit (21) for extracting pitch frequency of the speech signal waveform, a digital filter (23) for extracting, as a feature parameter, spectrum data of the speech signal waveform, and a filter coefficient setting circuit (22) for setting a filter coefficient so that a resonance frequency of the digital filter is an integral multiple of the pitch frequency. The feature parameter extracted from the feature extracting circuit is stored in an input pattern memory (3). A recognition processing portion (50) evaluates similarity between the feature parameter stored in advance in a registration pattern memory (4) and the feature parameter stored in the input pattern memory, so that speech recognition processing is made. Improved signal in noise performance results from very narrow bandwidth filters.

12 Claims, 17 Drawing Sheets

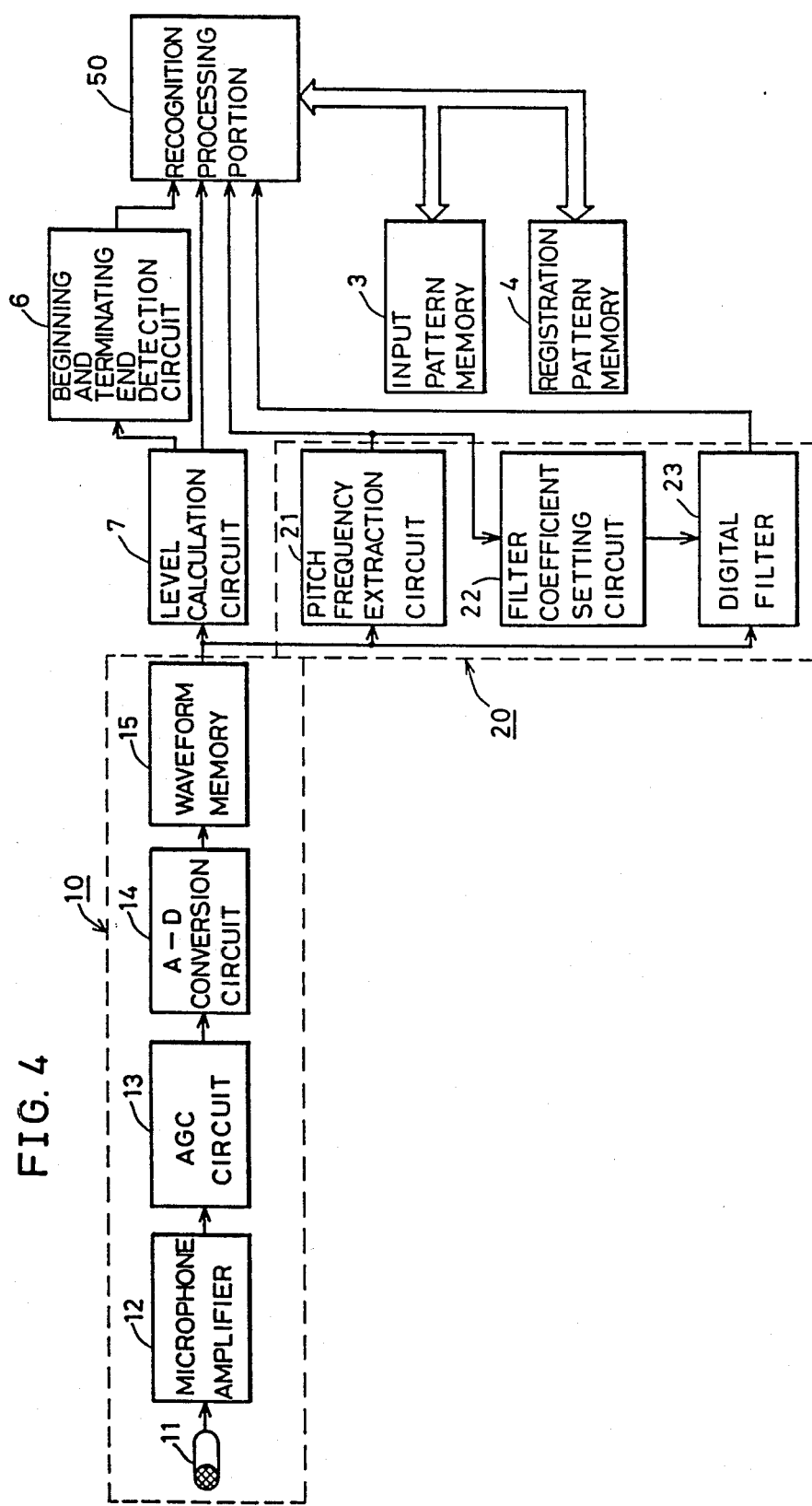

NOISE REMOVEMENT EXPLANATORY DIAGRAM fp : PITCH FREQUENCY
B₀ : BANDWIDTH

SPEECH RECOGNITION APPARATUS

This is a continuation-in-part of application Ser. No. 645,663, filed Aug. 30, 1984, abandoned.

BACKGROUND OF THE INVENTION

1. Field of the Invention

The present invention relates to a speech recognition apparatus, and in particular, to a speech recognition apparatus for controlling various units or entering data to the units by voice. More specifically, it relates to a speech recognition apparatus which recognizes a voiced sound utilizing the frequency spectrum thereof as one of features of the voice.

2. Description of the Prior Art

As a conventional speech recognition apparatus, "Word Speech Recognition Apparatus" invented by Ken Nishimura in Japan, disclosed in the Japanese Patent Laying-Open Gazette No. 119198/1981, and "Microprocessor Implementation of an LPC-Based Isolated Word Recognizer" invented by John G. Ackenhusen Bell Laboratories, have been known. FIG. 1 is a schematic block diagram of a conventional speech recognition apparatus. In FIG. 1, a voice input portion 1 includes a microphone, an amplifier and a low-pass filter (not shown) for converting a voice into an electric signal and inputting the same. The output from the voice input portion 1 is fed to a feature extracting portion 2 as well as to a beginning and terminating end detection circuit 6. The feature extracting portion 2 analyzes the inputted aural signal to extract feature parameters of the voice, which in turn are fed to a recognition processing portion 5. The beginning and terminating end detection circuit 6 is adapted to detect beginning and terminating ends of a word speech. The result of detection by the beginning and terminating end detection circuit 6 is fed to the recognition processing portion 5, which comprises a microprocessor and a microcomputer etc., for performing recognition processing of the voice. The recognition processing portion 5 is connected to an input pattern memory 3 and a registration pattern memory 4.

Such a conventional speech recognition device or apparatus divides the voice waveform into frames of predetermined times, to extract the frequency spectrum per frame as a feature parameter. In a registration mode, the recognition processing portion 5 writes feature parameters of an extracted registration word or of a standard voice in the registration pattern memory 4. That is, the registration pattern memory 4 previously stores feature parameters of voices of a plurality of words. In a speech recognition mode, the recognition processing portion 5 writes the feature parameters of the extracted word speech in the input pattern memory 3, and sequentially calculates or evaluates similarity between the feature parameters stored in the input pattern memory 3 and those of the plurality of words stored in the registration pattern memory 4, thereby to recognize the word speech based on the results of the evaluation.

FIG. 2 is a circuit diagram showing the feature extracting portion 2 as shown in FIG. 1 in further detail. In FIG. 2, the aural signal from the voice input portion 1 is fed to bandpass filters 201-1, 201-2, . . . , 201-N, which are adapted to pass specific frequency components of the aural signal waveform. Outputs from the bandpass filters 201-1 to 201-N are, respectively, fed to smoothing circuits 202-1 to 202-N, outputs of which are, in turn, fed to an analog multiplexer 203. The analog multiplexer 203 functions as a circuit for passing the outputs from the respective smoothing circuits 202-1 to 202-N in a time sharing manner. The output from the analog multiplexer 203 is fed to an A-D (analog-to-digital) conversion circuit 204, to be converted into a digital data and outputted from the same.

FIG. 3 is an illustration showing frequency characteristics of the bandpass filters 201-1 to 201-N as shown in FIG. 2. As seen from FIG. 3, the bandpass filters 201-1 to 201-N are set to substantially uniformly extract all frequency components of the voice waveform by N units of filters. In this case, the features of the voice are expressed by large and small patterns of N units of values of the frequency components extracted by the N units of filters. The number N is generally selected from 8 to 16, and relatively satisfactory voice feature parameters can be obtained when no noise is mixed in the voice waveform. Thus, the recognition capacity of the conventional speech recognition device has been sufficiently satisfactory in this case. Typical filter center frequencies and bandwidths at the −3db points for the filters of FIG. 3 are given in Table 1 as follows:

TABLE 1

| CHANNEL NUMBER | CENTRAL FREQUENCY AND BAND WIDTH OF FILTER | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| CENTRAL FREQUENCY fo (Hz) | 300 | 450 | 600 | 750 | 900 | 1050 | 1250 | 1450 | 1650 | 1850 | 2050 | 2300 | 2550 | 2800 | 3050 | 3300 |
| BAND WIDTH Bo (Hz) | 150 | 150 | 150 | 150 | 150 | 175 | 200 | 200 | 200 | 200 | 225 | 250 | 250 | 250 | 250 | 325 |

However, when the voice to be recognized is mixed with noises such as those of a factory and other voices, the frequency components of the noises pass through the bandpass filters 201–201-N simultaneously with those of the subject voice, to influence the values of the feature parameters. When extraction accuracy of the feature parameters is evaluated by spectrum distortion, the feature parameters are significantly affected by the spectrum distortion of the inputted waveforms caused by the noises of the conventional recognition apparatus. Thus, recognition capacity of the conventional recognition apparatus is remarkably degradated when used in noisy circumstances.

SUMMARY OF THE INVENTION

The present invention provides speech recognition apparatus which represents excellent recognition capacity even in noisy circumstances, by forming a feature extracting portion by a digital filter accommodated to pitches of voices.

Briefly stated, a pitch frequency of speech is detected based on the speech signal outputted from speech signal inputting means and a filter coefficient of a digital filter is set so that a resonance frequency of the digital filter is an integral multiple of the detected pitch frequency. Then, spectrum data of the speech signal from the digital filter is extracted as a feature parameter which is stored in an input pattern storing means. Speech recognition processing means evaluates similarity between the feature parameter stored in the input pattern storing means and the feature parameter stored in advance in registration pattern storing means for performing speech recognition processing.

Accordingly, in accordance with the present invention, feature parameter is less likely to receive distortion even if an input speech signal has a large spectrum distortion caused due to noise, since only harmonic components of the pitch frequency of the speech signal are extracted as a feature parameter. In addition, even if a high noise is mixed, most of the frequency components of that noise is cut off by the digital filter and hence is never outputted. Accordingly, degradation of recognition capacity can be made extremely small even in circumstances of high noise.

In a preferred embodiment of the present invention, a single digital filter is provided in which different filter coefficients are set in a time divisional manner in response to detected pitch frequency, or, a plurality of digital filters are provided, in which the respective filter coefficients of the corresponding digital filters are set in response to the detected pitch frequencies.

In a further preferred embodiment of the present invention, a digital filter comprises a primary differential circuit for receiving aural signal, a two-stage lattice-type filter for receiving the output from the primary differential circuit, a square-law circuit for receiving the output from the two-stage lattice-type filter and an integrating circuit for receiving the output from the square-law circuit.

In other aspect of the present invention, feature parameters of the applied speech signal waveform are extracted and the power thereof is evaluated. In response to the evaluated power, the beginning and the terminating ends of the speech signal are detected and in response to the detection signal of the beginning and the terminating ends of the speech signal, the amplitude and time base of the feature parameters are normalized. Thereafter, in the registration mode, a time sequential pattern as normalized is stored in the registration pattern storing means, and, in recognition mode, a time sequential pattern as normalized is stored in the input pattern storing means. The similarity between the content of the time sequential pattern stored in the input pattern storing means and the content of the time sequential pattern stored in the registration pattern storing means is evaluated by means of pattern matching, so that speech recognition processing is made.

Accordingly, in a further aspect of the present invention, since the amplitude and time base of the feature parameters are normalized for speech recognition, the difference of phoneme can be appropriately detected as a distance even if a pitch frequency is in largely different speech signal waveform, and hence recognition capacity can be enhanced.

In a still further aspect of the present invention, feature parameters are extracted from the speech signal waveform and stored in the input pattern storing means, and, the feature parameters are stored in advance in the registration pattern storing means. In the recognition mode, a spectrum input pattern obtained from a primary interpolation of the feature parameters stored in the input pattern storing means by means of a predetermined constant comparison frequency as evaluated and the spectrum registration pattern obtained from a primary interpolation of the feature parameters stored in the registration pattern storing means by means of a predetermined constant comparison frequency. Matching distances between frames in these input spectrum patterns and spectrum registration patterns are evaluated, so that the feature parameter stored in the registration pattern storing means which is to be a minimum matching distance is provided as a recognition result.

Accordingly, in a further aspect of the present invention, the distance between the registration pattern and the input pattern can be effectively evaluated, since the spectrum pattern is evaluated through a primary interpolation of the feature parameter by a predetermined constant comparison frequency.

In a still further aspect of the present invention, in the recognition mode, the pitch frequency in the feature parameter stored in the input pattern storing means is compared with the pitch frequency in the feature parameters stored in the registration pattern storing means and the spectrum pattern is evaluated and obtained through a primary interpolation of the feature parameters having low pitch frequency, so that the matching distances between the feature parameter having high pitch frequencies and the frame in the spectrum pattern are evaluated, whereby the feature parameter of the speech stored in the registration pattern storing means which is to be a minimum matching distance is provided as a recognition result.

The above and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a schematic block diagram showing an embodiment of the present invention;

DESCRIPTION OF THE PREFERRED EMBODIMENTS

Figure 1:
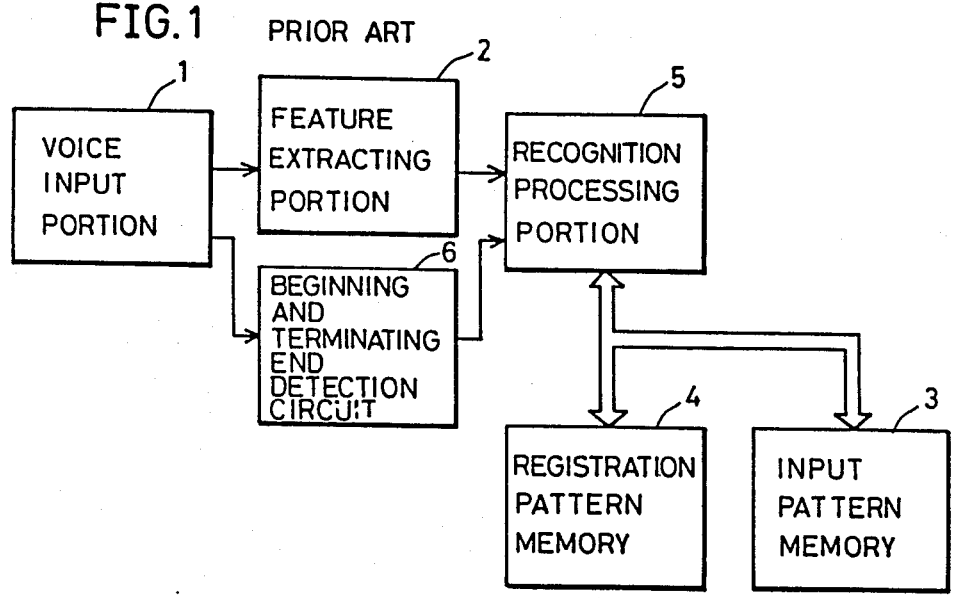
FIG. 1 is a schematic block diagram showing an example of a conventional speech recognition apparatus.
Figure 2:
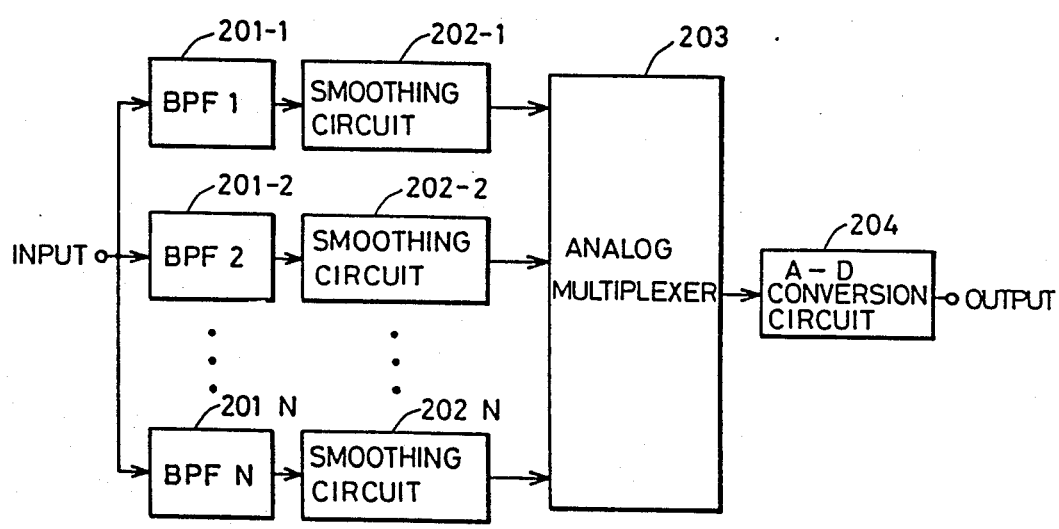
FIG. 2 is a detailed block diagram of the feature extracting portion included in the speech recognition apparatus as shown in FIG. 1.
Figure 3:
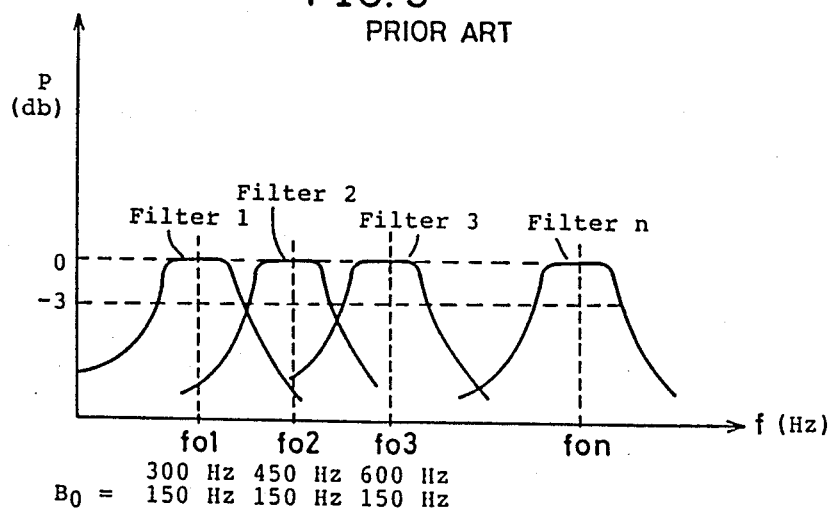
FIG. 3 is a diagram showing frequency characteristics of the bandpass filter as shown in FIG. 2.

FIG. 4 is a schematic block diagram showing an embodiment of the present invention. In FIG. 4, a voice input portion 10 includes a microphone 11, a microphone amplifier 12, an AGC (automatic gain control) circuit 13, an A-D (analog-to-digital) conversion circuit 14 and a waveform memory 15. An output from the voice input portion 10 is fed to a level calculation circuit 7, as well as to a feature extracting portion 20. The output from the level calculation circuit 7 is fed to a beginning and terminating end detection circuit 6, as well as to a recognition processing portion 50 configured by components such as a microprocessor and a microcomputer.

Figure 5:
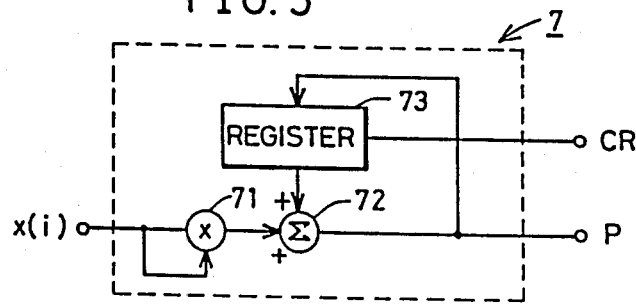
FIG. 5 is a block diagram specifically showing a level calculation circuit as shown in FIG. 4.

The level calculation circuit 7 calculates the power P from waveform data x(i) outputted from the waveform memory 15, in which i represents 1, 2, ..., $I_f$, to generate the memory P, and is configured by, for example, a multiplier 71, an adder-subtractor 72 and a register 73 as shown in FIG. 5. When the register 73 is cleared by a CR (carriage return) signal which indicates delimitation of the frames, the waveform data x(i) are inputted in the multiplier 72 sequentially by one frame to be squared, whereby the squared data are added in the adder-subtractor 72 to the data stored in the register 73 to be outputted as the power P as expressed by the following formula (1):

$$P = \sum_{i=1}^{I_f} x(i)^2 \quad (1)$$

At this time, the register 73 sequentially temporarily stores the power P by one frame to sequentially feed the stored contents to the adder-subtractor 72.

Figure 6:
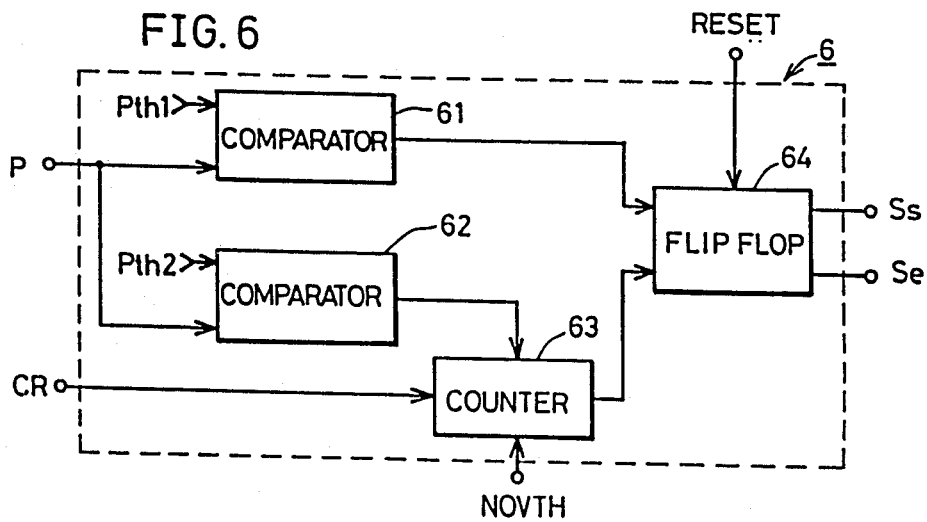
FIG. 6 is a block diagram specifically showing a beginning and terminating end detection circuit as shown in FIG. 4.

The beginning and terminating end detection circuit 6 receives the power P from the level calculation circuit 7, to feed the outputs thereof, i.e., a beginning end detection signal Ss and a terminating end detection signal Se to the recognition processing portion 50. The beginning and terminating end detection circuit 6 is formed by, e.g., first and second comparators 61 and 62, a down counter 63 and a flip-flop 64 as shown in FIG. 6. First, in the flip-flop 64, the beginning end detection signal Ss is set at an "H" level and the terminating end detection signal Se is set at an "L" level by reset signals indicating initialization of the speech recognition apparatus. In this condition, the power P from the level calculation circuit 7 is inputted in the first comparator 61, which in turn compares the power P with a first reference signal $Pth_1$ which is the threshold of the power for detecting the beginning end, to output an "H" level signal when the power P is higher than the first reference signal $Pth_1$ and, to the contrary, output an "L" level signal when the power P is lower than the first reference signal $Pth_1$.

When the flip-flop 64 receives the "H" level output from the first comparator 61, the beginning end detection signal Ss becomes an "H" level and the terminating end detection signal Se becomes an "L" level. On the other hand, the second comparator 62 compares the power P from the level calculation circuit 7 with a second reference signal $Pth_2$ which is the threshold of the power for detecting no sound, to output an "H" level signal when the power P is higher than the second reference signal $Pth_2$ and output an "L" level signal when the power P is lower than the second reference signal $Pth_2$. When the down counter 63 receives the "H" level output from the second comparator 62, the count value of the down counter 63 is set at the threshold NOVTH of the non-sound pressure function for detecting the terminating end while the output to the flip-flop 64 is turned to an "L" level. When the CR signal is inputted in the down counter 63 while the "L" level output is generated from the second comparator 62, the count value at the down counter 63 is reduced by one. When the count value at the down counter 63 becomes zero, the output to the flip-flop 64 is turned to an "H" level. Upon receiving the "H" level output from the down counter 63, the beginning end detection signal Ss of the flip-flop 64 is turned to an "L" level while the terminating end detection signal Se is turned to an "H" level.

In other words, the beginning and terminating end detection circuit 6 outputs an "H" level signal as the beginning end detection signal Ss when the power P from the level calculation circuit 7 is higher than the first reference signal $Pth_1$, and, to the contrary, outputs an "H" level signal as the terminating end detection signal Se upon continuation of the frame in which the power P is lower than the second reference signal $Pth_2$ for NOVTH. The outputs thus obtained in the beginning and terminating end detection circuit 6, i.e., the beginning end detection signal Ss and the terminating end detection signal Se are supplied to the recognition processing portion 50.

The feature extracting portion 20 includes a pitch cycle extraction circuit 21, a filter coefficient setting circuit 22 and a digital filter 23. The pitch cycle extraction circuit 21 and the digital filter 23 are supplied with the outputs from the voice input portion 10, i.e., the waveform data x(i) from the waveform memory 15. The outputs from the pitch cycle extraction circuit 21 are fed to the recognition processing portion 50 as well as to the filter coefficient setting circuit 22. The outputs from the filter coefficient setting circuit 22 are fed to the digital filter 23, whose outputs are in turn fed to the recognition processing portion 50.

Figure 7:
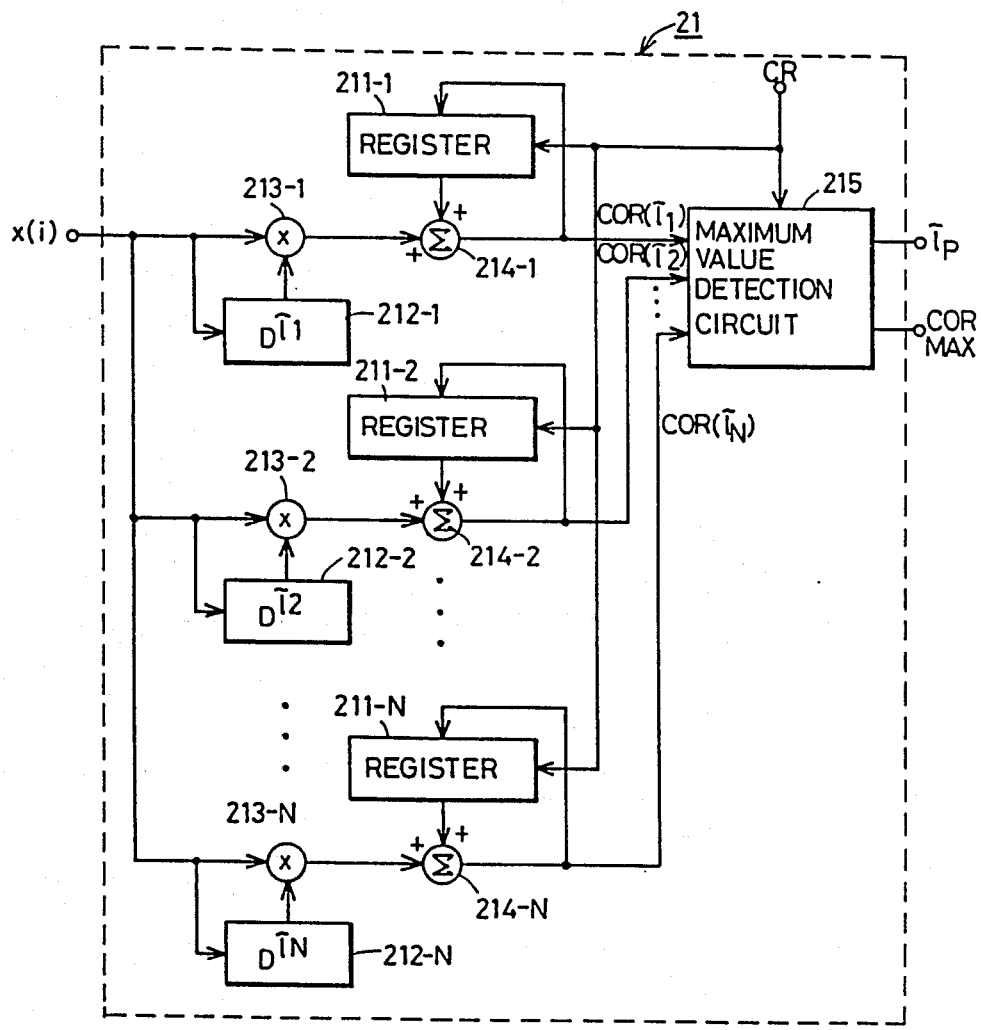
FIG. 7 is a block diagram specifically showing a pitch cycle extraction circuit as shown in FIG. 4.

The pitch cycle extraction circuit 21 calculates an auto-correlation function COR($\tau$) of the waveform data x(i) from the waveform memory 15 to find the pitch cycle as the maximum self function value $\tau$ within the range for searching the pitch cycle, and is formed by e.g., as shown in FIG. 7, N units of registers 211-1 to 211-N, $\tau_1$-degree delay element 212-1 to $\tau_N$-degree delay element 212-N, N units of adder-subtractors 214-1 to 214-N and a maximum value detection circuit 215 comprising an integrated circuit of a comparator or a microcomputer. First, the N units of registers 211-1 to 211-N are cleared by input of the CR signal. In this condition, the waveform data x(i) from the waveform memory 15 are inputted in the N units of adder-subtractors 214-1 to 214-N sequentially by one frame, as well as to the $\tau_1$-degree delay element 212-1 to $\tau_N$-degree delay element 212-N and $\tau_N$ to be delayed respectively by $\tau_1$-degree to $\tau_N$-degree, thereby being inputted in corresponding adder-subtractors 214-1 to 214-N. The respective adder-subtractors 214-1 to 214-N output products of the waveform data x(i) and the outputs from the corresponding $\tau_1$-degree delay element 212-1 to $\tau_N$-degree delay element 212-N. The data of the products are respectively added in the adder-subtractors 214-1 to 214-N to the data stored in corresponding registers 211-1 to 211-N, to generate outputs (COR$\tau_1$) to COR($\tau_N$) as expressed by the following formula:

$$COR(\tau) = \sum_{i=1}^{I_f - \tau} x(i) \cdot x(i + \tau) \quad (2)$$

At this time, the respective registers 211-1 to 211-N temporarily store corresponding auto-correlation functions COR($\tau_1$) to COR($\tau_N$) sequentially by one frame, to sequentially feed the stored contents to the corresponding adder-subtractors 214-1 to 214-N.

When the next CR signal is inputted in the maximum value detection circuit 215, the pitch cycle extraction circuit 21 finds a maximum auto-correlation function $$COR_{MAX} \left( = \mathop{MAX}_{n=1}^{N} \{COR(\tau_N)\} \right) \quad 55$$

in the auto-correlation functions COR($\tau_1$) to COR($\tau_N$) from the adder-subtractors 214-1 to 214-N as well as a degree $\tau_p$ providing the value COR$_{MAX}$, i.e., the pitch cycle $\tau_p$, thereby to output the maximum auto-correlation function COR$_{MAX}$ and the pitch cycle $\tau_p$.

Figure 8A:
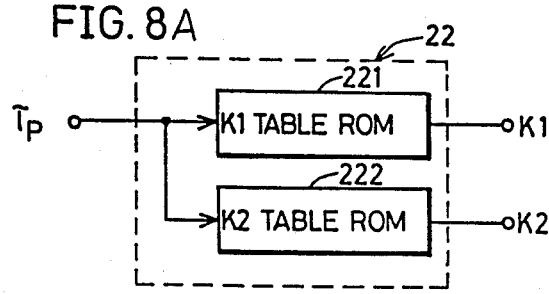
FIG. 8A is a circuit diagram specifically showing a filter coefficient setting circuit as shown in FIG. 4.

The filter coefficient setting circuit 22 generates a filter coefficient such that an integral multiple of the pitch frequency (reciprocal number of the pitch cycle $\tau_p$) is equivalent to the resonance frequency of the digital filter 23 to set the generated filter coefficient in the digital filter 23, and is implemented by means in which filter coefficient tables are formed by ROMs for retrieving the contents of the ROMs in correspondence to the pitch frequency and an integral multiple thereof. As shown in FIG. 8A, for example, the filter coefficient setting circuit 22 comprises a $K_1$ table ROM 221 and a $K_2$ table ROM 22, and when the pitch cycle $\tau_p$ from the pitch cycle extraction circuit 21 is fed to the $K_1$ table ROM 221 and the $K_2$ table ROM 222 as an address, the $K_1$ table ROM 221 outputs a filter coefficient $K_1$ and the $K_2$ table ROM 222 outputs a filter coefficient $K_2$ as data corresponding to the address respectively.

Figure 8B:
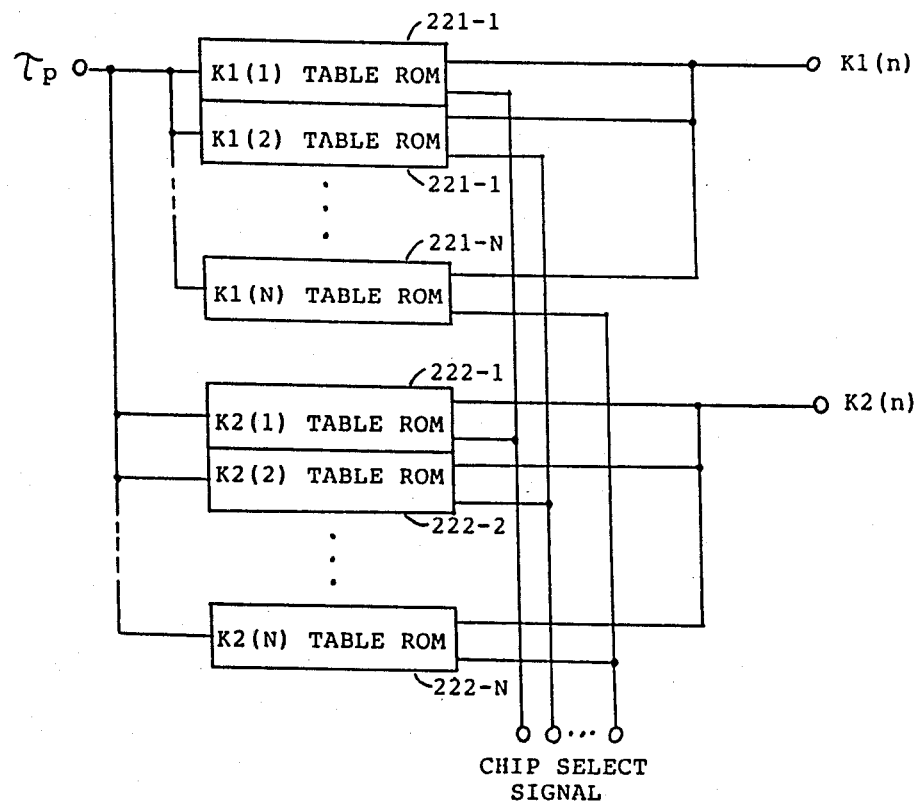
FIG. 8B is a circuit diagram showing a filter coefficient setting circuit in further detail.

Specific pitch frequency generation from a table ROM can be carried out in any number of ways. FIG. 8B is a diagram similar to FIG. 8A, in more detail, for example, a pitch cycle $\tau_p$ (wherein a pitch frequency $F_p = F_s/\tau_p$, and $F_s$ is a sampling frequency) is extracted from the pitch cycle extraction circuit 21. Corresponding data is produced from each K1 table ROMs 221-1 through 221-n and K2 table ROMs 222-1 through 222-N, where $\tau_p$ is used as an address. Simultaneously, filter coefficients K1(1) and K2(2), where the resonance frequency of digital filter 23 is $f_p$ are produced from the table ROMS 221-1 and 222-1, and filter coefficients K1(N) and K2(n), where the resonance frequency of digital filter 23 i n.$f_p$, are produced from table ROMs 221-n and 222-n. One set of filter coefficients among K1(1) and K2(1) to K1(N) and K2(N) is supplied to digital filter 23 by means of an ROM chip select signal. If, however, there are n digital filters, a chip select signal is not necessary.

Figure 9:
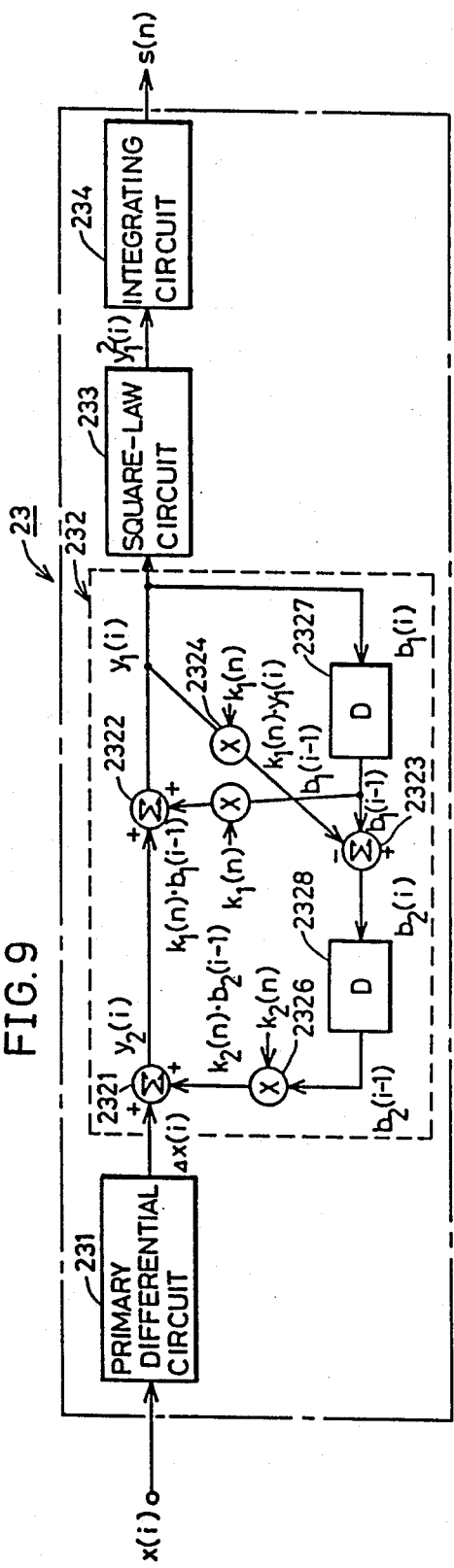
FIG. 9 is a block diagram specifically showing a digital filter as shown in FIG. 4.
Figure 10:
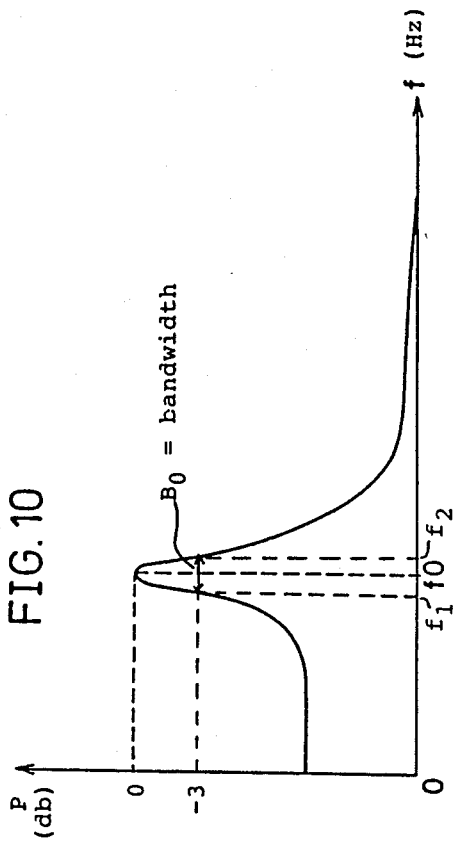
FIG. 10 is an illustration showing characteristics of the digital filter as shown in FIG. 9.

The digital filter 23 is formed by, for example, a primary differential circuit 231, a two-stage lattice-type filter 232, a square-law circuit 232 and an integrating circuit 234 as shown in FIG. 9. FIG. 10 is a response graph of the digital filter of FIG. 9, wherein a bandwidth Bo is defined by the −3db points.

A bandpass filter of a speech recognition apparatus according to the present invention is adapted to have the center frequency and the bandwidth shown in Table 2 as follows, whereby an apparatus with a small degradation of recognition capacity due to noises can be obtained.

TABLE 2

CENTRAL FREQUENCY AND BAND WIDTH OF FILTER

| CHANNEL NUMBER | 1 | 2 | 3 | 4 | 5 | 6 | 7 | 8 | 9 |
|---|---|---|---|---|---|---|---|---|---|
| CENTRAL FREQUENCY fo (Hz) | 225~375 | 375~525 | 525~675 | 675~825 | 825~975 | 975~1150 | 1150~1350 | 1350~1550 | 1550~1750 |
| BAND WIDTH Bo (Hz) | 10 | 10 | 10 | 10 | 15 | 15 | 15 | 20 | 20 |

| CHANNEL NUMBER | 10 | 11 | 12 | 13 | 14 | 15 | 16 |
|---|---|---|---|---|---|---|---|
| CENTRAL FREQUENCY fo (Hz) | 1750~1950 | 1950~2175 | 2175~2425 | 2425~2675 | 2675~2925 | 2925~3175 | 3175~3500 |
| BAND WIDTH Bo (Hz) | 25 | 25 | 30 | 35 | 40 | 45 | 50 |

Note that the bandwidths as shown in Table 2 are an order of magnitude smaller than in the prior art filters of Table 1, supra.

Figure 24:
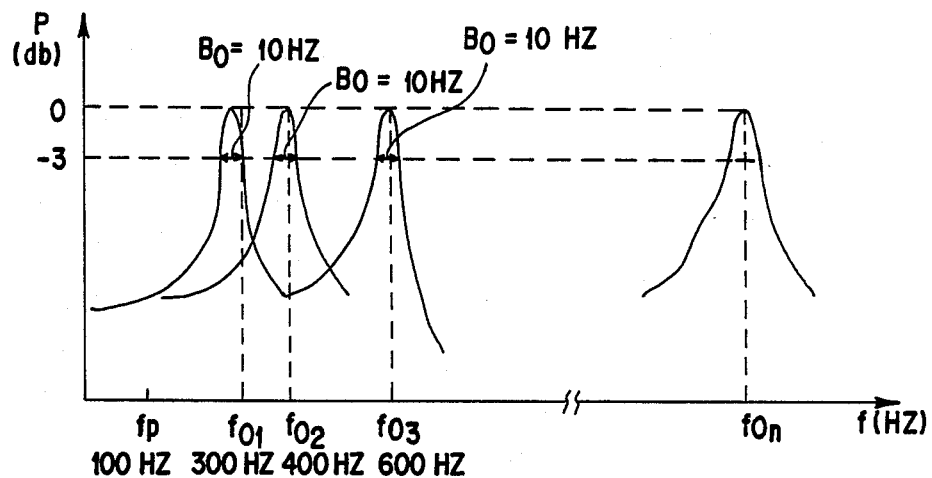
FIG. 24 is a graph of the frequency response of multiple pitch adaptive filters.

When the pitch frequency $f_p = 100$Hz, the central frequency of the filters may be chosen with 300, 400, 600, . . . , 3200 Hz in order from the filter 1 in view of Table 2 (if there are more than two possible values, the lower value is selected in this embodiment. For example, the filter 16 has 3200, 3300, 3400 and 3500Hz for the central frequency, and selects the lowest value, 3200Hz). This group of filters are shown in FIG. 24. When the pitch frequency is varied, the central frequency of the filter is certainly varied accordingly.

In Table 2, the value (f0) may be varied within a predetermined range because f0 is set to an integral multiple of a pitch frequency fp and is not fixed to a single value.

Figure 23:
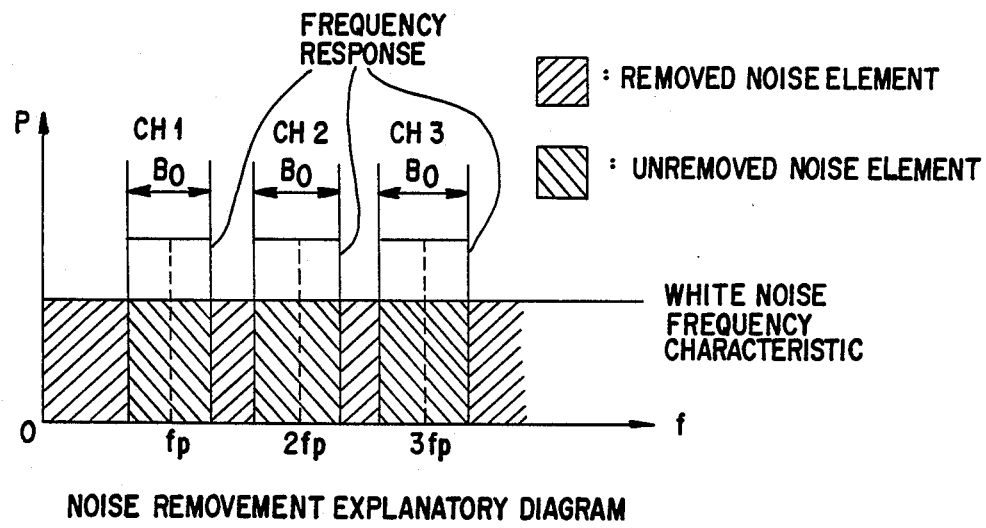
FIG. 23 is a graph of noise bands removed by filtering.

The bandwidth of a filter with which a speech recognition apparatus relates to its capacity for resisting or attenuating noise. Consider that white noise is added to a speech. Assuming that a bandwidth of a bandpass filter of a speech recognition apparatus according to the present invention is BO, and the bandwidth BO is 1/m of the pitch frequency of a speech $$(BO=1/m \cdot fp),$$

the removed noise element as shown in FIG. 23 becomes 0 in case of m=1, and the removed noise element become ½ in case of m=2, and the removed noise element becomes ¾ in case of m=4. In other words, when the bandwidth BO is equal to the pitch frequency fp, the present invention is of no effect, while, when BO becomes smaller than fp, the present invention becomes effective. It is understood that the pitch frequency of vowel in human speech is about 80-250 Hz for men and about 170-350 Hz for women. Therefore, when the bandwidth becomes smaller than these frequencies, the capability for resisting noises according to the present invention is developed. In the equation $B_O = 1/m \cdot f_p$, m is a coefficient indicating the ratio of the bandwidth of the filter to the pitch frequency. When $f_p$ is constant, as m increases, the bandwidth $B_O$ will become narrow, with a result that the filter becomes steep. m is used to describe the principle, and does not determine the bandwidth $B_O$.

It is disclosed by the formula (9) and its corresponding description that BO is remarkably narrow, when $K_2(n) \approx -1$. BO=0, when $K_2(n)=1$. fs is generally in the range of 5-20 kHz in the field of speech recognition. for example, when fs=10kHz and $K_2(n) \approx -1$, $K_2(n) = -0.99$, then according to the formula (9) the bandwidth BO $\approx$ 16 (Hz). When $K_2(n) = -0.98$, BO $\approx$ 32 (Hz). When $K_2(n) = -0.97$, BO $\approx$ 48 (Hz).

Figure 25:
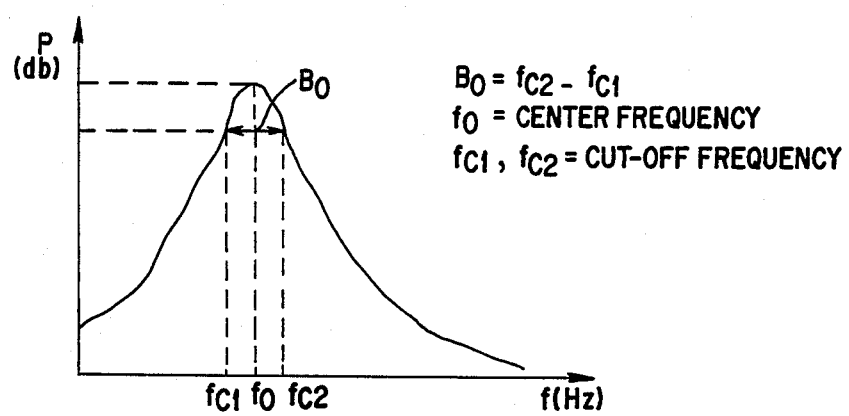
FIG. 25 is a graph of filter response obtained by K1(n) and K2(n).

Referring to FIG. 25, with respect to the frequency response of the filter obtained by K1(n) and K2(n). The relationship between K1(n), K2(n). The relationship between K1(n), K2(n) and $f_O$, $B_O$ is shown in the formulas (8) and (9).

Thus a suitable bandpass filter has a bandwidth $B_O(=f_{c2}-f_{c1})$, of which is defined under 80Hz, wherein $F_0$ is the central frequency, $f_{c1}$, $f_{c2}$ ($f_{c1} < f_{c2}$) are the cut-off frequencies of −3dB. Since the pitch frequency of the human speech is more than about 80Hz, the above defined 80Hz is the critical frequency with which the present invention gives effect. The narrower the bandwidth, the more effectively noises are removed. However, when the pitch frequency is not extracted accurately due to the operation accuracy, it is preferable that the bandwidth of the bandpass filter having high central frequency is broader than that of low central frequency. With respect to the frequency n times multiplied by the pitch frequency, error will be $n \cdot (f_p - \overline{f_p})$, wherein $f_p$ is true pitch frequency and $\overline{f_p}$ is extracted pitch frequency. As n increases, error will increase.

Thus, a "remarkably narrow bandwidth" according to the present invention is independent from the operating frequency of a filter, and in any case is less than half of the pitch frequency of vowel in human speech, or less than about 50 Hz.

The primary differential circuit 231 comprises a subtractor etc. for stressing high-pass frequencies, and receives the outputs x(i) from the waveform memory 15 to generate an output Δx(i) by calculation of the following formula:

$$\Delta x(i) = x(i) - x(i-1) \quad (3)$$

the two-stage lattice-type filter 232 includes three adder-subtractors 2321 to 2323, three multipliers 2324 to 2326 and two delay circuits 2327 and 2328, such that the multipliers 2324 and 2325 receive the filter coefficient $K_1(n)$ from the filter coeffiecient setting circuit 22 and the multiplier 2326 receives the filter coefficient $K_2(n)$ from the filter coefficient setting circuit 22. The two-stage lattice-type filter 232 receives the output x(i) from the primary differential circuit 231 to execute sequential calculation of the following formulas (4) to (7):

$$y_2(i) = \Delta x(i) + K_2(n) \cdot b_2(i-1) \quad (4)$$

$$y_1(i) = y_2(i) + K_1(n) \cdot b_1(i-1) \quad (5)$$

$$b_2(i) = b(i-1) - K_1(n) \cdot y_1(i) \quad (6)$$

$$b_1(i) = y_1(i) \quad (7)$$

it is to be noted that initial values $b_2(i)$ and $b_1(i)$ are set at zero, and n represents an nth calculated value set by the filter coefficient setting circuit 22, which value corresponds to an n-degree harmonic wave of the pitch frequency. The two-stage lattice-type filter 232 has resonance characteristics of a resonance frequency $f_0$ and a bandwidth $B_0$, relation between the filter coefficients $K_1(n)$ and $K_2(n)$ from the filter coefficient setting circuit 22 and the resonance characteristics being expressed by the following formulas (8) and (9):

$$K_1(n) \approx \cos 2\pi (f_0/f_s) \quad (b\ 8)$$

$$K_2(n) \approx -\exp(-2\pi B_0/f_s) \quad (9)$$

in which $f_s$ represents a sampling frequency. When $K_2(n) \approx -1$, that is, the bandwidth $B_0$ is remarkably narrow, the two-stage lattice-type filter 232 presents a high-peaking characteristic with a high quality factor as shown in FIG. 10.

The square-law circuit 233 and the integrating circuit 234 are formed by well-known circuits, to find the output $y_1(i)$ from the two-stage lattice-type filter 232 by calculation of the following formula (10), whereby the integrating circuit 234 generates a filter output S(n):

$$S(n) = \sum_{i=2}^{I_f} y_1(i) \cdot y_1(i) \quad (10)$$

Operation processing in the digital filter 23 is executed N times for the common waveform data x(i) from the waveform memory 15 with respect to the filter coefficeint values to a predetermined degree N, thereby to obtain outputs s(n) (n represents 1, 2, . . . , N). As described in the foregoing, the filter coefficients $K_1(n)$ and $K_2(n)$ are set by the filter coefficient setting circuit 22 such that the harmonic component of the pitch frequency matches the resonance frequency of the filter, whereby the filter output s(n) corresponds to a value in which the pitch frequency harmonic component included in the waveform data x(i) from the waveform memory 15 is exclusively extracted.

Referring to FIGS. 9 and 10, amplitude normalization is carried out as follows. A spectrum pattern of the i-th frame is given by:

$$S_i = \begin{pmatrix} S_{i1} \\ S_{i2} \\ S_{iN} \end{pmatrix}$$

where N represents the number of channels in a digital filter. The spectrum pattern is extracted by the digital filter independent of the amplitude of the input waveform, as shown in FIG. 9, so that the spectrum data of the speech can be compared with analyzed phoneme data. Changes in spectrum data caused by amplitude changes of the input speech signal make it difficult to obtain a phoneme distance between frames using pattern matching techniques. Therefore, normalization of the spectrum is accomplished by obtaining the value of the entire spectrum $$\overline{S_i} = \sum_{n=1}^{N} S_{in}$$

of an analysis frame as follows:

$$a_i = C \cdot S_i / \overline{S_i}$$

Figure 11:
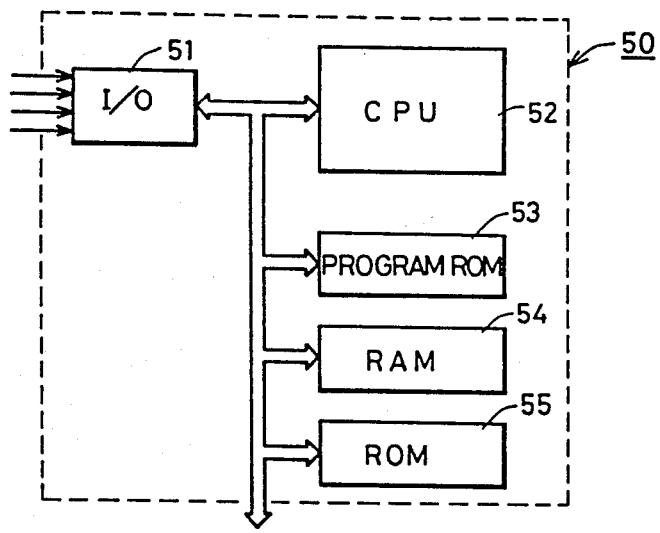
FIG. 11 is a block diagram specifically showing a recognition processing portion as shown in FIG. 4.

FIG. 11 is a circuit diagram showing a recognition processing portion as shown in FIG. 4 in further detail.

As shown in FIG. 11, the recognition processing portion 50 comprises a CPU (central processing unit) 52 and a microcomputer having a program ROM 53 storing a program for operating the CPU 52, an I/O (input-output) device 51 for receiving the beginning end detection signal Ss and the terminating end detection signal Se from the beginning and terminating end detection circuit 6, the power P from the level calculation circuit 7 and the data from the feature extracting portion 20, i.e., the pitch frequency $\tau_p$ and the filter output s(n), a RAM (random access memory) 54 for temporarily storing data, a ROM 55 for storing data, and the like and is connected to an input pattern memory 3 and a registration pattern memory 4 formed by RAMs etc.

The recognition processing portion 50 normalizes the amplitudes and the time bases of the feature parameters s(n) fed from the digital filter 23 of the feature extracting portion 20, thereby to write normalized spectrum time-series patterns in the registration pattern memory 4 in the registration mode while writing the same in the input pattern memory 3 in the recognition mode, and evaluates similarity of the contents of the registration pattern memory 4 and the input pattern memory 3 by pattern matching, to obtain the result of recognition.

Figure 12:
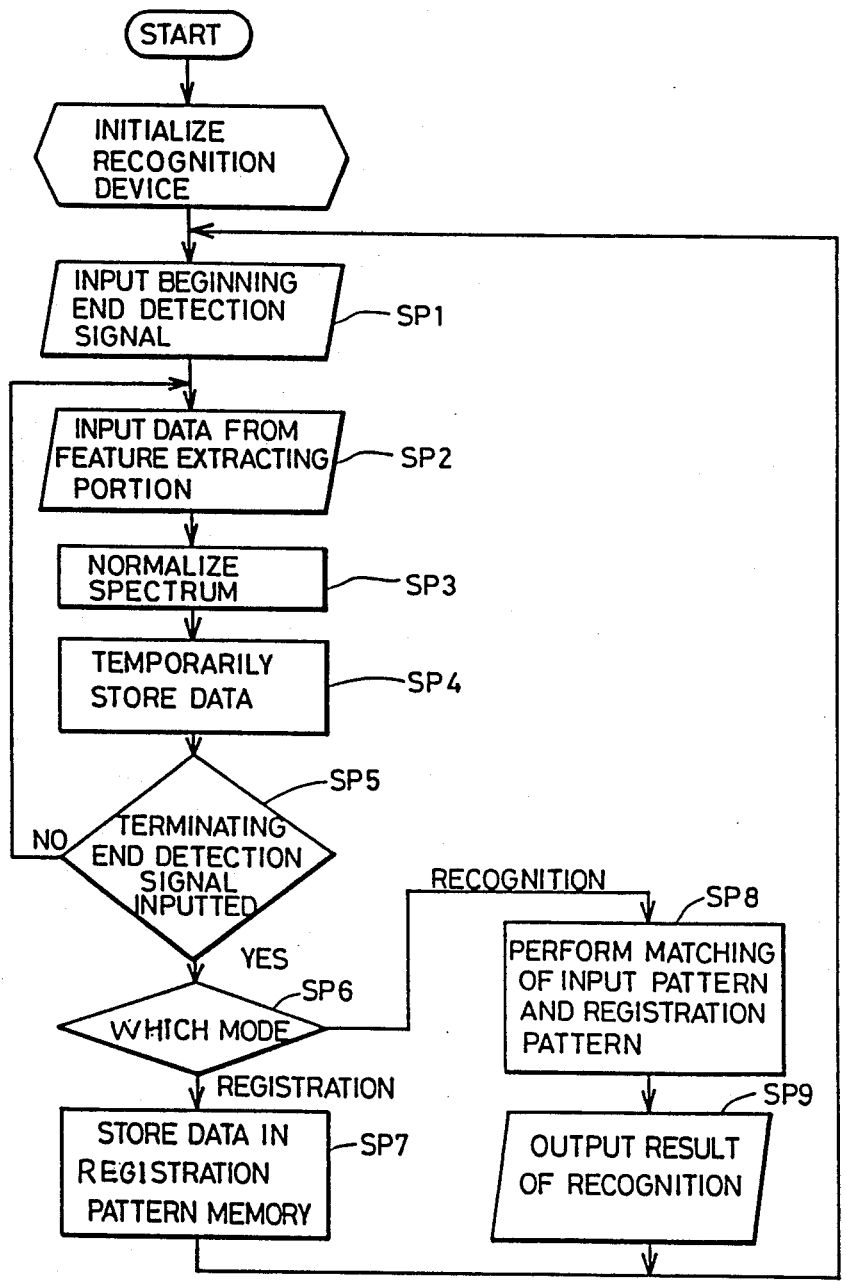
FIG. 12 is a flow chart for explaining an operation of a recognition processing portion.

That is, the recognition processing portion 50 operates as shown by a flow chart in FIG. 12. At a step SP1, the recognition processing portion 50 receives the beginning end detection signal Ss from the beginning and terminating end detection circuit 6 while receiving the data from the feature extracting portion 20 at a step SP2, and normalizes the amplitudes and the time bases of the feature parameters s(n) which are the data from the feature extracting portion 20 at a step SP3, thereby to temporarily store the normalized data in the RAM 54 at a step SP4. Then, a determination is made at a step SP5 as to whether or not the terminating end detection signal Se is inputted from the beginning and terminating end detection circuit, and if the determination is "no", the process is returned to the step SP3. If the determination is "yes", i.e., the terminating end detection signal Se is inputted, the process is advanced to step SP6 to make a determination as to the mode. If the determination is of "registration mode", the normalized data of the feature parameters s(n) temporarily stored in the RAM 54 are stored in the registration pattern memory 4 at the step SP7, whereafter the process is returned to the step SP2. If, on the other hand, the determination is of "recognition mode", the normalized data stored in the RAM 54 are written in the input pattern memory 3 at a step SP8, whereby similarity of the contents written in the input pattern memory 3 and those stored in the registration pattern memory 4 is evaluated by pattern matching, and the result of the recognition is outputted at a step SP9. Thereafter the process is returned to the step SP2, to repeat similar operations.

Description is now made with respect to the operation of the speech recognition device structured in the aforementioned manner. As shown in FIG. 4, the waveform of the voice inputted through the microphone 11 is amplified by the microphone amplifier 12, and is adjusted by the AGC circuit 13 so that the maximum waveform value comes to a predetermined level, thereby to be converted into a digital number in the A-D conversion circuit 14 per sampling point. The sampling data x(i) by one frame is temporarily stored in the waveform memory 15. The data x(i) in the waveform memory 15 thus temporarily stored are subjected to the calculation shown by the above formula (1) in the level calculation circuit 7, which, in turn, feeds the power P of the frame to the recognition processing portion 50. In the recognition processing portion 50, a determination is made as to whether or not the inputted waveform signal is a voiced sound, based on the power P. Further, the power P from the level calculation circuit 7 is fed to the beginning and terminating end detection circuit 6 to be processed therein, whereby the beginning end detection signal Ss and the terminating end detection signal Se are fed to the recognition processing portion 50.

On the other hand, the temporarily stored data x(i) from the waveform memory 15 are fed to the pitch cycle extraction circuit 21 of the feature extracting portion 20. Upon reception of the data x(i) from the waveform memory 15, the pitch cycle extraction circuit 21 calculates the formula (2) as described in the foregoing to find the auto-correlation function value of the data x(i), thereby to feed the pitch cycle $\tau_p$ providing the maximum self function value in the range for searching the pitch cycle to the recognition processing portion 50 and the filter coefficient setting circuit 22. Upon receiving the pitch cycle $\tau_p$, the filter coefficient setting circuit 22 generates the filter coefficients $K_1$ and $K_2$ such that an integral multiple of the pitch frequency, i.e., the reciprocal number of the pitch frequency $\tau_p$ is equivalent to the resonance frequency of the digital filter 23. Upon receiving the filter coefficients $K_1$ and $K_2$, the digital filter 23 executes calculation on the inputted data x(i) from the waveform memory 15 by the above described formulas (3) to (7) and (10) based on the filter coefficients $K_1$ and $K_2$, thereby supplying the recognition processing portion 50 with the filter outputs s(n), which are used as principal data for the recognition processing operation.

The recognition processing portion 50 receives the beginning end detection signal Ss and the terminating end detection signal Se from the beginning and terminating end detection circuit 6, the power P from the level calculation circuit 7 and the filter outputs s(n) from the digital filter 23 to perform operations based on the flow chart as shown in FIG. 12, so that the data based on the filter outputs s(n), i.e., the feature parameters are stored in the registration pattern memory 4 in the registration mode, and similarity between the data based on the feature parameters temporarily stored in the input pattern memory 3 and the data stored in the registration pattern memory 4 is evaluated by pattern matching to obtain the result of recognition in the recognition mode.

Description is now made with respect to functions characterizing the speech recognition apparatus being in the aforementioned structure. One of the features of the present embodiment is that the level of the waveform is calculated per frame by digital processing, to detect a significant part of the voice waveform, i.e., the frame of a vowel sound. Another feature of the present embodiment resides in finding the pitch cycle with respect to such vowel sound frame by means such as an auto-correlation process. Still another feature of the present embodiment is that the resonance-type digital filter is provided thereby to exclusively extract the harmonic component of the pitch frequency. As a general feature of the voice waveform, a voiced sound such as a vowel sound has high power, and voice information is not so much masked by mixing of a high noise. Further, the pitch frequency can be accurately extracted by employing a pitch extraction process such as the auto-correlation process, even if a white noise is mixed therein. Besides, a voiced sound such as a vowel sound is in discrete spectrum structure having the components exclusively in an integral multiple of the pitch frequency, whereby the patterns of the spectrum serve as information effective for discriminating the vowel sound. Therefore, the outputs from the digital filter 23 resonant with the frequency in an integral multiple of the pitch frequency extracted by the feature extracting portion 20 of the speech recognition apparatus in the present embodiment serve as the feature parameters expressing the features of the vowel sound as they are. In addition, even if a high noise is mixed, most of the frequency components thereof are cut off by the digital filter 23 from being outputted. Thus, the feature parameters of an inputted voice waveform are not so much distorted by large spectrum distortion caused by a noise, and are useful for effective recognition. In the recognition device of the present embodiment, therefore, degradation of recognition capacity by noise can be remarkably reduced, whereby the recognition capacity is highly improved.

Figure 13:
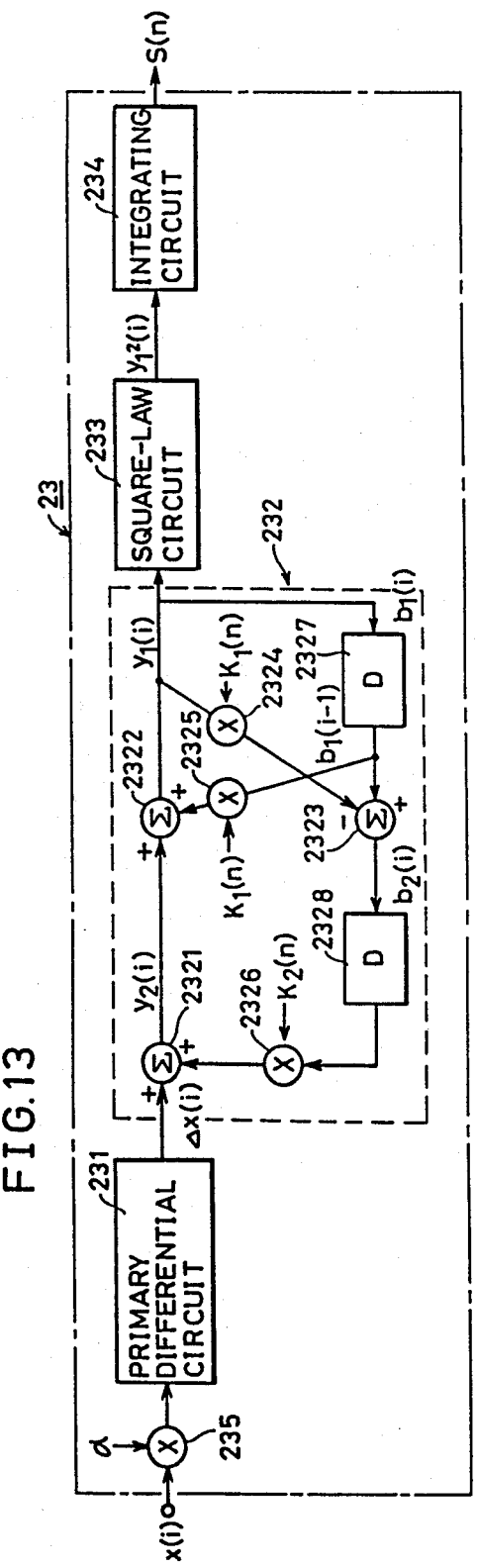
FIG. 13 is a block diagram showing a modified structure of the digital filter.

FIG. 13 is a block diagram showing modified structure of the digital filter 23 as shown in FIG. 9 with respect to the aforementioned embodiment. Since the structure shown in FIG. 13 is similar to that of FIG. 9 except for portions as described subsequently, explanation is omitted with respect to corresponding components as indicated by identical reference numerals. The structure as shown in FIG. 13 is characterized in that a multiplier 235 is provided in the front stage of a primary differential circuit 231 to enable increase and decrease of the voice waveform. By insertion of the multiplier 235, the aforementioned formula (3) is turned into the following formula (11):

$$\Delta x(i) = \alpha\{(x(i) - x(i-1)\} \quad (11)$$

in which $\alpha$ represents a waveform multiplying coefficient, which can be set at a desired value. When the power of the voice waveform is too much high, the result of integration of the value s(n) as obtained by the aforementioned formula (8) may be possibly be overflown. Therefore, the value $\alpha$ is decreased when the power of the waveform is high and vice versa thereby to improve the dynamic range of filter operation. The value as calculated by the level calculation circuit 7 may be employed as the power value. Assuming that the power which assures that the filter operation is not diverged when the value $\alpha$ is constant ($\alpha = \alpha_1$) is represented by $P_H$, divergence of spectrum operation can be prevented, when the power is lower than the value $P_H$, by:

$$\alpha = \alpha_1 \quad (12)$$

and when the power exceeds the value $P_H$, by:

$$\alpha = \alpha_1 \sqrt{P_H/P} \quad (13)$$

Figure 14:
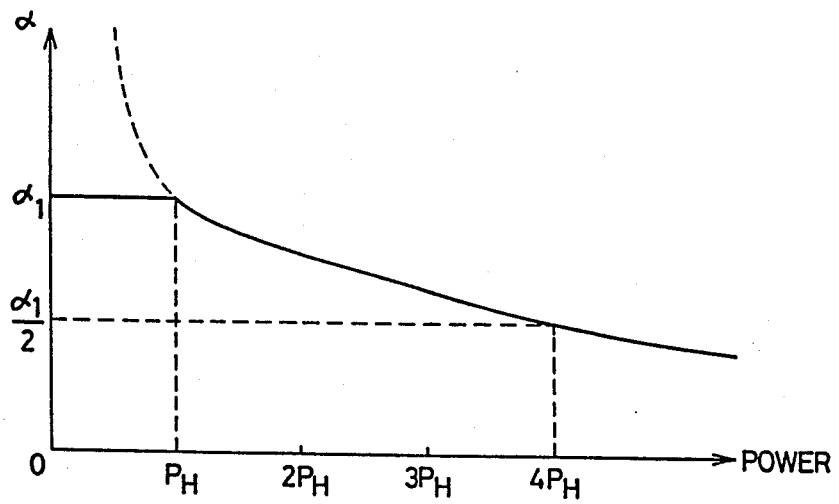
FIG. 14 is an illustration showing characteristics of $\alpha$ and power of the digital filter as shown in FIG. 13.

In the above formula (13), P represents the power. The relation between the value $\alpha$ and the power is shown in FIG. 14. Upon receiving the power from the level calculation circuit 7, a recognition processing portion 50 calculates the value $\alpha$, which in turn is set in the multiplier 235.

Figure 15:
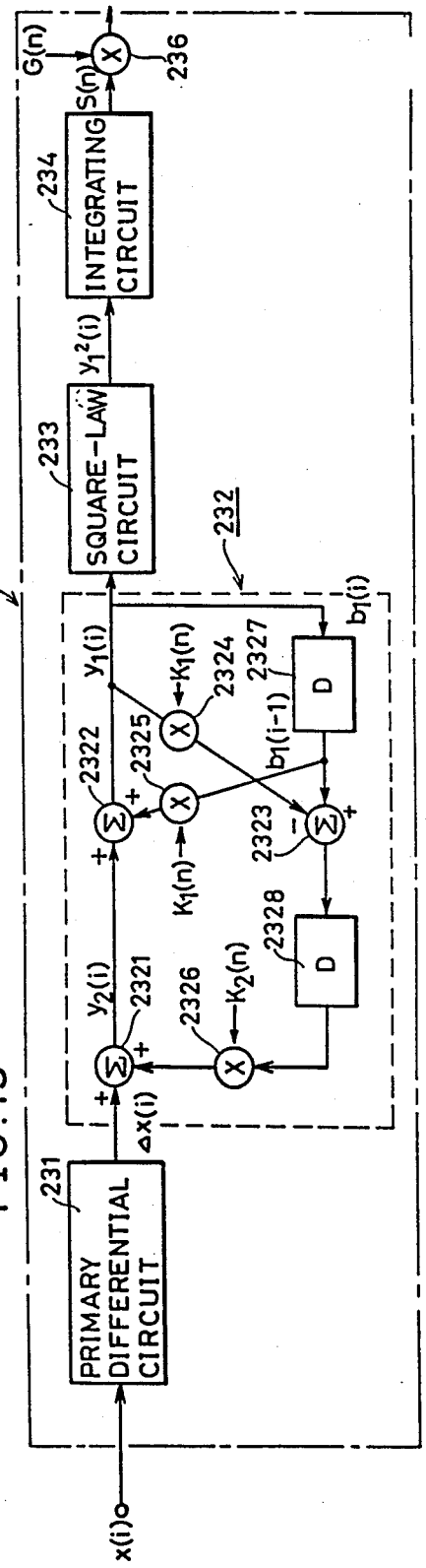
FIG. 15 is an illustration showing a further modified digital filter.

FIG. 15 is a block diagram showing still another modification of the digital filter 23 as shown in FIG. 9 with respect to the aforementioned embodiment. It is to be noted that, in FIG. 15, components similar to those of the digital filter 23 in FIG. 9 are indicated by similar reference numerals, and explanation thereof is omitted. The structure as shown in FIG. 15 is characterized in that a multiplier 236 is inserted in the rear stage of an integrating circuit 234 thereby to enable adjustment of the frequency characteristics of the filter. The gain GN(n) of a two-stage lattice-type filter 232 is expressed by the following formula (14):

$$GN(n) = \frac{1}{(1 + B_2)\sqrt{1 + \frac{B_1^2}{4B_2}}} \quad (14)$$

The values $B_1$ and $B_2$ in the above formula (14) are expressed by the following formulas (15) and (16):

$$B_1 = K_1(n) - K_1(n) \cdot K_2(n) \quad (15)$$

$$B_2 = K_2(n) \quad (16)$$

In addition to the values $K_1(n)$ and $K_2(n)$, a filter coefficient setting circuit 22 sets in the multiplier 236 a gain correction coefficient as expressed by the following formula:

$$G(n) = 1/(GN^2(n)) \quad (17)$$

Thus, the result of filter operation with a constant gain can be obtained by providing the multiplier 236 to multiply the spectrum value s(n) obtained by the filter operation by the value G(n), whereby the recognition capacity is improved.

Although the above description has been made with respect to a speech recognition apparatus of a specified speaker registered type for the purpose of convenience in explanation, the present invention can be applied to a speech recognition apparatus of an unspecified speaker type in which feature parameters of word speeches are previously stored in a ROM.

Further, although the digital filter in the above embodiment has been described mainly with respect to a two-stage lattice-type filter, it may be replaced by a digital filter of a polarity with a high quality factor, whose characteristics can be changed per frame.

In addition, although the filter coefficient is set in a time sharing manner in one digital filter in the aforementioned embodiment, a plurality of digital filters may be provided in a parallel manner to set different filter coefficients simultaneously in the respective digital filters, thereby to make resonance frequencies of the respective digital filters in integral multiples of pitch frequencies.

Further, although the waveform multiplying coefficient $\alpha$ is found by the power of the aural signal in the embodiment as shown in FIG. 13 an amount (e.g., level) corresponding to the waveform of the aural signal may be calculated other than the power, to find the value $\alpha$ by the calculated amount.

Still further, although the gain correction coefficient is set in the embodiment as shown in FIG. 14 such that the gain of the filter output becomes absolutely constant, the gain of the filter output may not be thus absolutely constant, with allowance of slight scattering.

Since, according to each of the aforementioned embodiments of the present invention, the harmonic components of the pitch frequency of the aural signal are exclusively extracted as the feature parameters, the feature parameters are not subjected to significant distortion even if input aural signal is in large spectrum distortion caused by a noise. Thus, an excellent speech recognition apparatus can be obtained with remarkably small degradation of recognition capacity caused by noises.

Description is now made with respect to still another embodiment of the present invention. According to this embodiment, there is provided a speech recognition device which has means for normalizing the spectrum patterns on frequency axes, thereby to find further effective distances and improve the recognition capacity. This embodiment is modification of that shown in FIG. 4, in which the program content in the recognition processing portion 50 is slightly changed.

Figure 16:
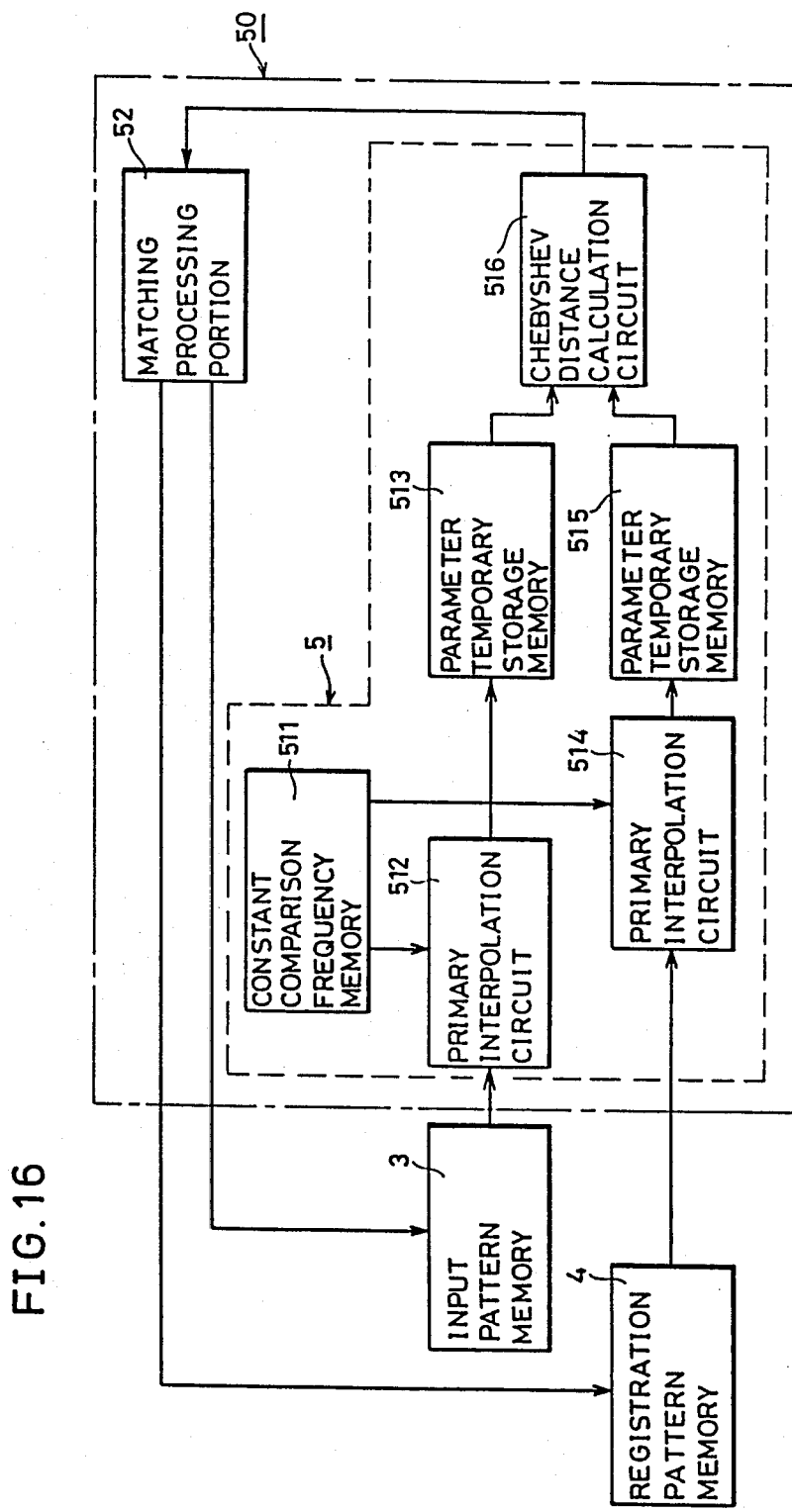
FIG. 16 is a block diagram showing a structure of a recognition processing portion included in another embodiment of the present invention.

FIG. 16 is a block diagram of a recognition processing portion 50 configured by components such as a microprocessor and a microcomputer, shown in functional blocks for the purpose of illustration. It is to be noted that components corresponding to the respective functional blocks are not configured in a hardware manner in the microprocessor, but are rendered to have functions by programs.

In FIG. 16, numeral 51 indicates a distance calculating portion for calculating distances between feature parameters of an analyzed voice stored in an input pattern memory 3 and frames in feature parameters of a standard voice stored in a registration pattern memory 4, and numeral 52 indicates a matching processing portion receiving the distances calculated in the distance calculating portion 51 as well as receiving the feature parameters of the analyzed voice stored in the input pattern memory 3 and the feature parameters of the standard voice stored in the registration pattern memory 4, for performing matching processing of the feature parameters. The distance calculating portion 51 functionally comprises a constant comparison frequency memory 511, a primary interpolation circuit 512 and a parameter temporary storage memory 513 in the input pattern side, a primary interpolation circuit 514 and a parameter temporary storage memory 515 in the registration pattern side and a Chebyshev distance calculation circuit 516. The constant comparison frequency memory 511 stores frequencies for performing comparison of spectrums. The primary interpolation circuits 512 and 514 perform primary interpolation in compliance with constant comparison frequencies from the constant comparison frequency memory 511 for performing normalization on frequency axes with respect to the spectrum patterns in the feature parameters by one frame of each of the input pattern memory 3 and the registration pattern memory 4 respectively. The parameter temporary storage memories 513 and 515 temporarily store spectrum patterns primarily interpolated in the primary interpolation circuits 512 and 514, respectively. The Chebyshev distance calculation circuit 516 calculates Chebyshev distances of the contents temporarily stored in the parameter temporary storage memory 513 and those temporarily stored in the parameter temporary storage memory 515. The Chebyshev distances calculated by the Chebyshev distance calculation circuit 513 are fed to the matching processing portion 52.

Figure 17:
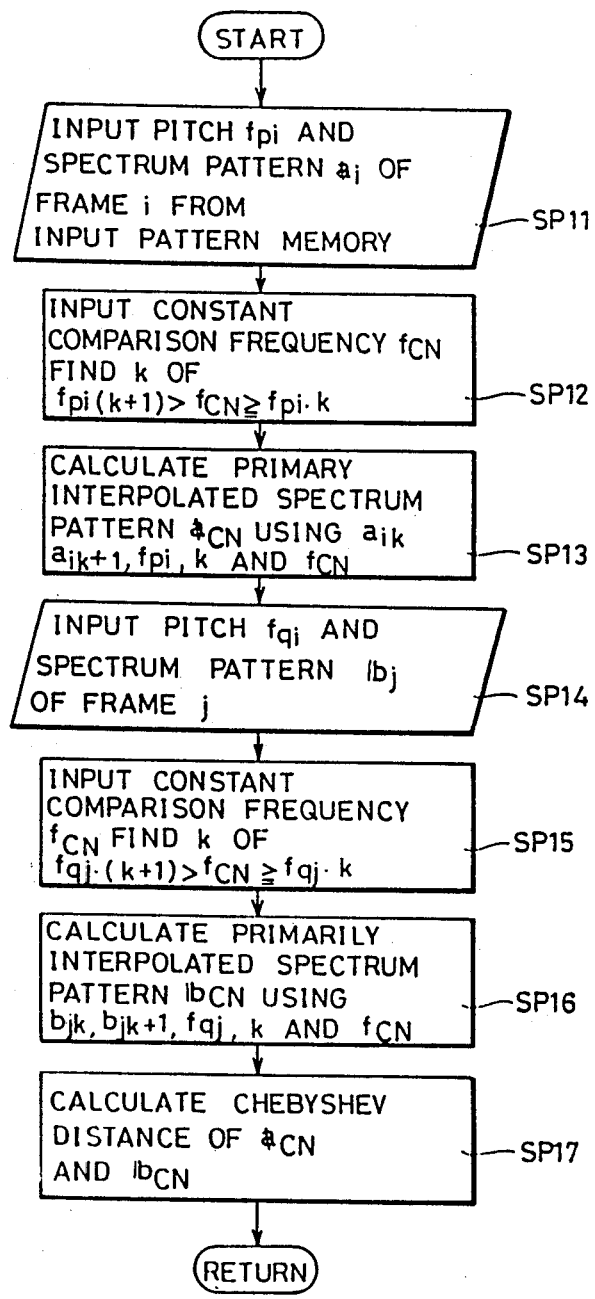
FIG. 17 is a flow diagram for explaining an operation of a distance calculating portion as shown in FIG. 16.
Figure 18:
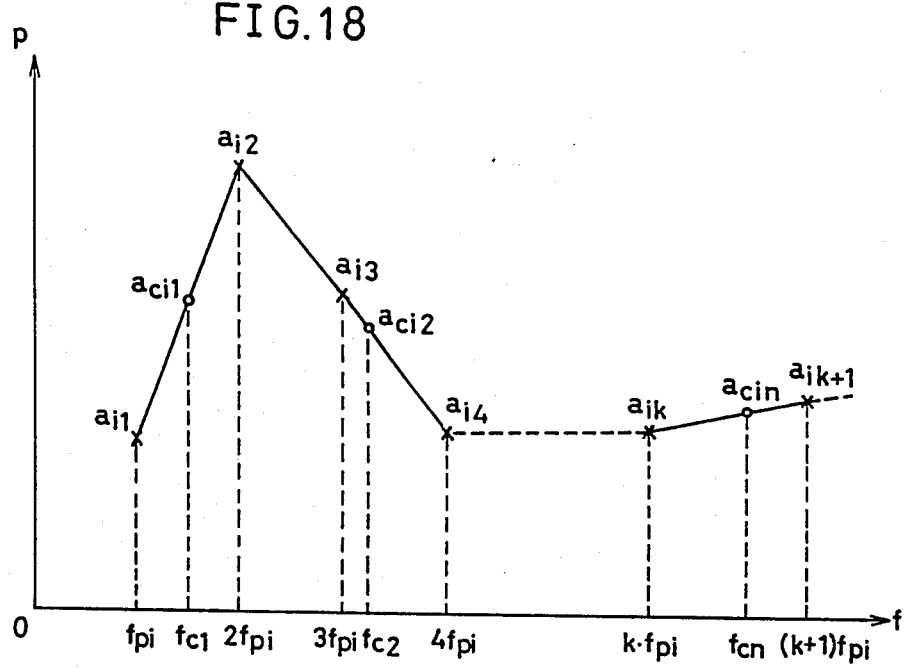
FIG. 18 is a diagram for explaining processes of interpolation of the distance calculating portion.

Description is now made with respect to operations at the distance calculating portion 51 and the matching processing portion 52, based on a flow chart as shown in FIG. 17. In the recognition mode, as described in the foregoing with respect to the above embodiment as shown in FIG. 4, the input pattern memory 3 receives from the feature extracting portion 2 pitch frequency time series $[f_{pi}]$ and spectrum time-series patterns $[a_{im}]$ (i=1, 2, ..., I), (m=1, 2, ..., M) (I:number of frames of an analyzed word, M:number of filters for spectrum analysis) as the feature parameters of one word to temporarily store the same, while, in the registration mode, the registration pattern memory 4 receives from the feature extracting portion 2 pitch frequency time-series $[f_{pj}]$ and spectrum time-series patterns $[b_{jm}]$ (j=1, 2, ..., J) (J:number of frames of a word) as the feature parameters of a word to store the same. At a step SP11, the primary interpolation circuit 512 receives the spectrum patterns $a_1 = (a_1, a_2, ..., a_M)$ of the frame 1 from the input pattern memory 3, and further receives, at a step SP12, constant comparison frequencies $f_c = (f_{c1}, f_{c2}, ..., f_{cn})$, n=1, 2, ..., $N_c$ ($N_c$ represents the number of the comparison frequencies) from the constant comparison frequency memory 511, to find an integral number k of $f_{pi}$ (k+1) > $f_{cn} \geq f_{pi}$·k in compliance with the value $f_{cn}$. Such interpolation is shown in FIG. 18. At a step SP13, the primary interpolation circuit 512 performs linear primary interpolation using the values $a_{ik}$ and $a_{ik+1}$ as shown in FIG. 18, to produce a spectrum $a_{cin}$ corresponding to the frequency $f_{c2}$.

The interpolation spectrum $a_{ci} = (a_{ci1}, a_{ci2}, ..., a_{ciNc})$ as found by the above described procedure is stored in the parameter temporary storage memory 513. In a similar manner, as shown at steps SP14, SP15 and SP16, the spectrum patterns $b_j$ outputted from the registration pattern memory 4 are interpolated by the primary interpolation circuit 514; so that $b_{cj} = (b_{cj1}, b_{cj2}, ..., b_{cjNc})$, to be stored in the parameter temporary storage memory 515. At a step SP17, the Chebyshev distance calculation circuit 516 calculates distances d(i, j) using the aforementioned values $a_{ci}$ and $b_{cj}$ as stored in the parameter temporary storage memory 515 as follows:

$$d(i, j) = \sum_{n=1}^{N} |a_{cin} - b_{cjn}| \qquad (18)$$

Upon receiving the distances d(i, j) as found in the aforementioned manner, the matching processing portion 52 performs matching processing using a well-known pattern matching process. Then, matching distances of the input patterns and the registration patterns are found, thereby to select the registration pattern having the minimum matching distance as the result of recognition.

Time base normalization as used herein refers to the thinning out of spectrum time sequential patterns. For example, if a spectrum time sequential pattern of one word is given by the expression $A_i$, $A_2$, ..., $A_I$ (where I is a frame length of one word) and an adjacent frame represents the same phoneme, normalization of the pattern results in retaining a single frame representing several frames and discarding the rest. This results in a reduction in memory requirements and time required to produce a match. For example, if the phoneme distances between $A_i$, $A_{i+1}$ and $A_{i+2}$ (obtained by the Chebyshev distance calculation or equivalent) are within a prescribed value, time based normalization retains $A_i$ while discarding $A_{i+1}$ and $A_{i+2}$ from the feature parameters.

Figure 19:
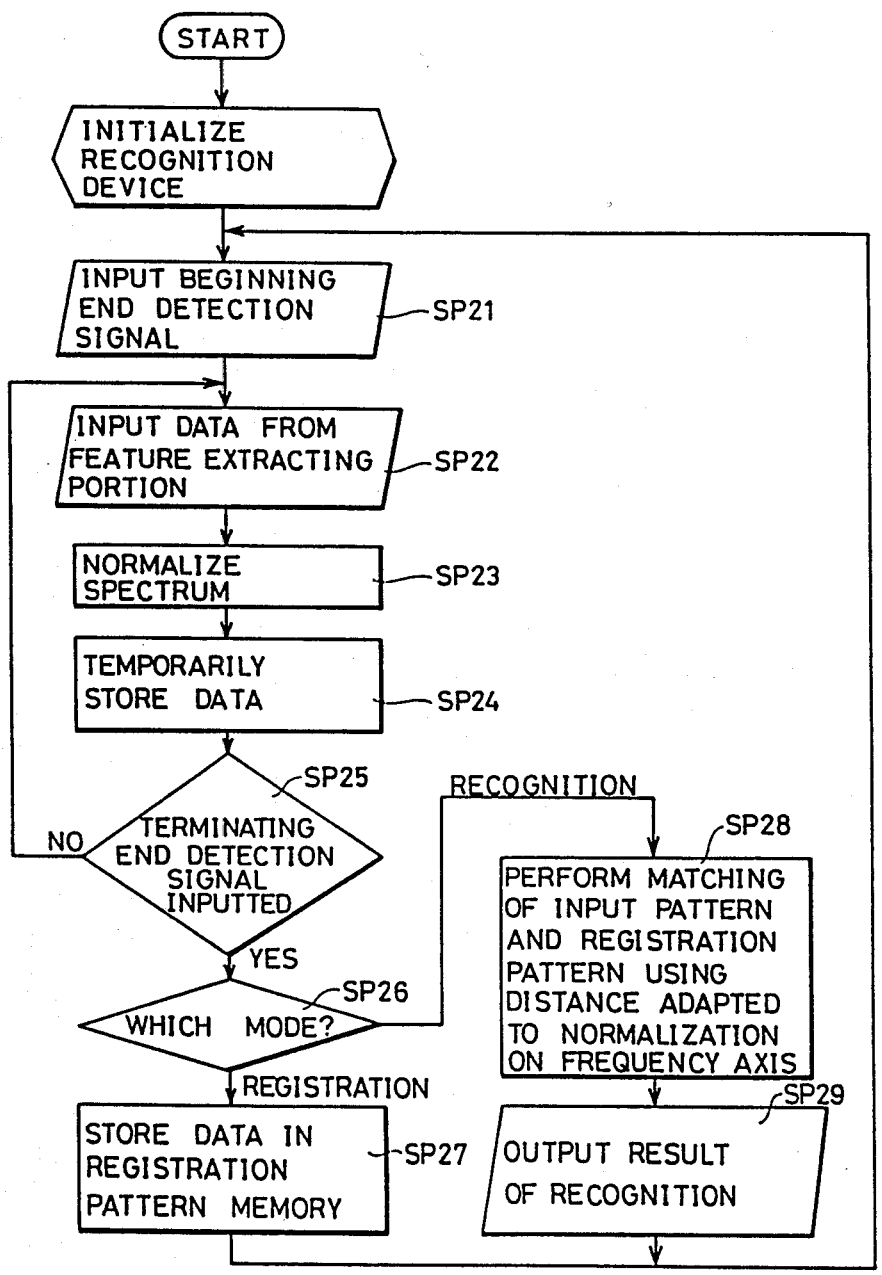
FIG. 19 is a flow diagram for explaining an operation of the recognition processing portion as shown in FIG. 16.

In operation of the speech recognition apparatus having such a recognition processing portion 50, similarly to the aforementioned embodiment as shown in FIG. 4, the recognition processing portion 50 receives the beginning end detection signal Ss and the terminating end detection signal Se from the beginning and terminating end detection circuit 6, the power P from the level calculation circuit 7 and the filter outputs s(n) from the digital filter 23, i.e., the feature parameters, to perform operations based on the flow chart as shown in FIG. 19, thereby to make the registration pattern memory 4 store the data based on the filter outputs, i.e., the feature parameters in the registration mode and, in the recognition mode in turn, calculate at the step SP18 the Chebyshev distances based on the flow chart of the distance calculating portion 51 as shown in FIG. 17 and perform matching processing of the data temporarily stored in the input pattern memory 3 and the data stored in the registration pattern memory 4 at the matching processing portion 52, to output the registration pattern having the minimum matching distance as the result of recognition.

Although normalization of the spectrum patterns on the frequency axes is performed during the recognition processing in the aforementioned embodiment, such normalization may be performed during the voice input operation, so that the obtained patterns $a_{ci}$(i=1, 2, ..., I) and $b_{cj}$(j=1, 2, ..., J) are previously stored in the input pattern memory 3 or the registration pattern memory 4.

Further, although linear primary interpolation is performed in the aforementioned embodiment, a secondary or higher degree interpolation process may be employed.

In addition, although the spectrum patterns are subjected to interpolation to be conformed to the constant comparison frequency in the aforementioned embodiment, a similar effect can be attained without performing the interpolation, by selecting the spectrum of a frequency most approximate to the constant comparison frequency, to be outputted to the parameter temporary storage memories 513 and 515.

Figure 20:
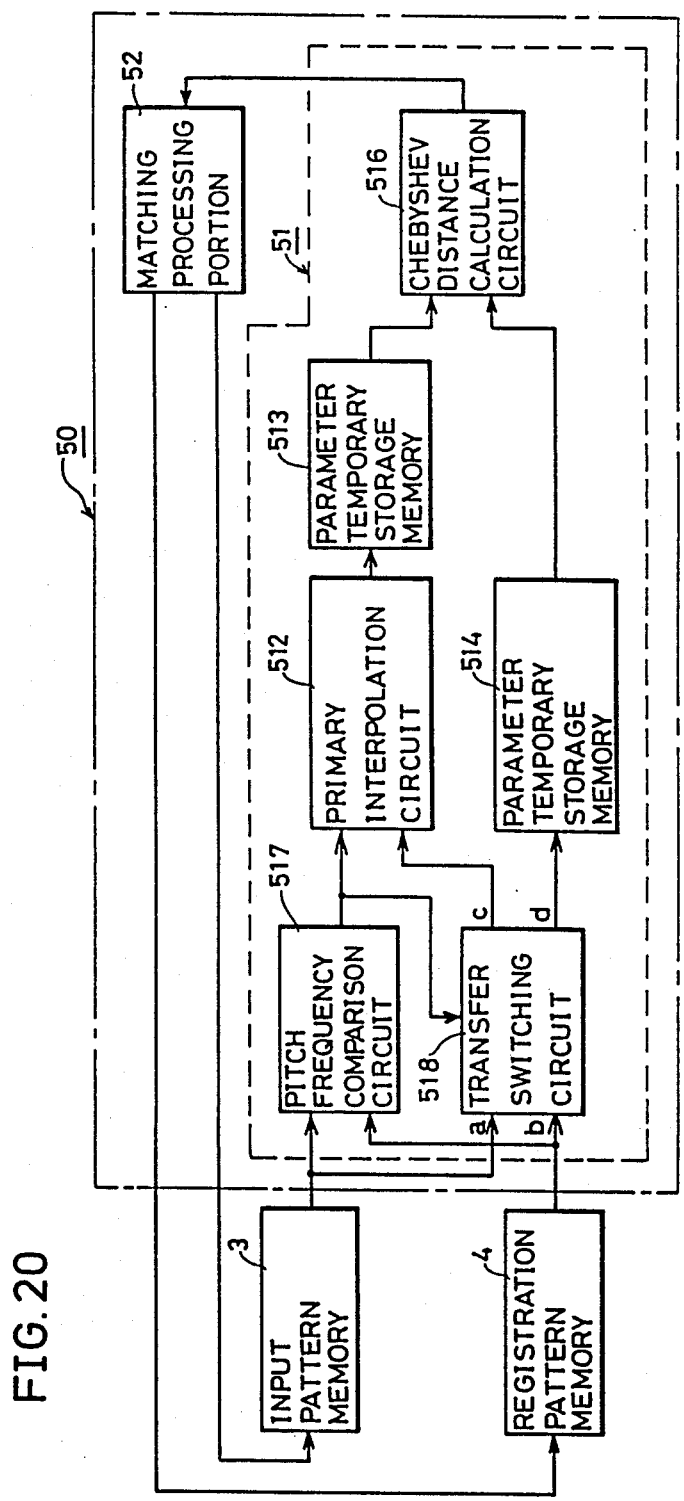
FIG. 20 is a block diagram showing a modified distance calculating portion in the embodiment shown in FIG. 16.

FIG. 20 is a functional block diagram showing another modified structure of the distance calculating portion 51 in the embodiment as shown in FIG. 16. The embodiment as shown in FIG. 20 is similar to that shown in FIG. 16, excepting that there are further provided a pitch frequency comparison circuit 517 for comparing the pitch frequencies of the input patterns with those of the registration patterns and a transfer switching circuit 518 for determining whether the spectrum parameters of the input patterns and the registration patterns are transferred to a primary interpolation circuit 512 or to a parameter temporary storage memory 514 in response to the outputs from the pitch frequency comparison circuit 517, while omitting the constant comparison frequency memory 511 and the primary interpolation circuit 514 in the embodiment as shown in FIG. 16.

Figure 22:
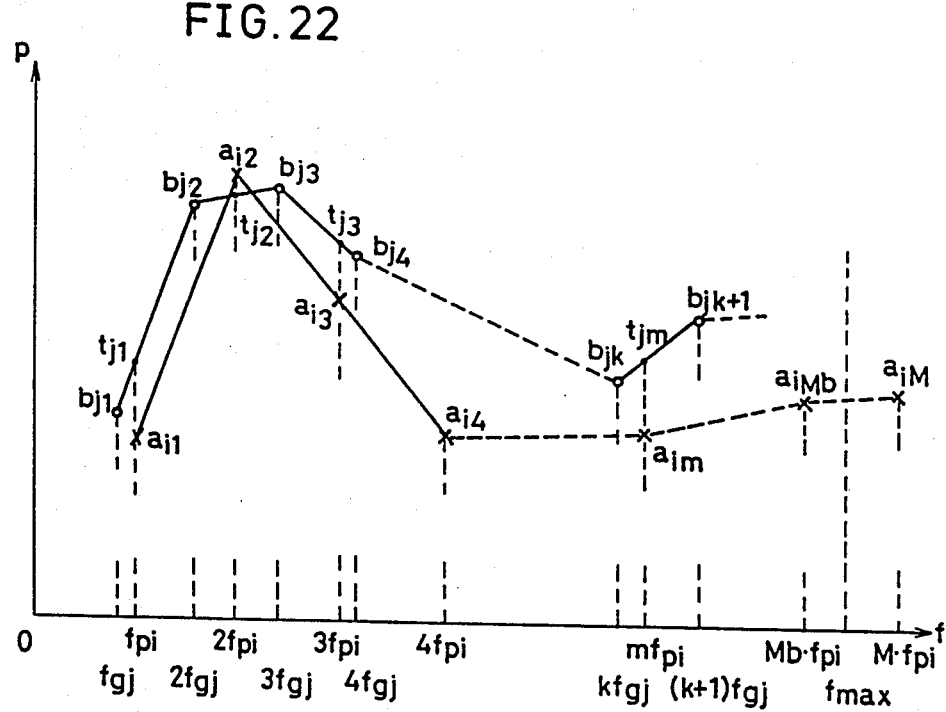
FIG. 22 is a diagram for explaining processes of interpolation by the distance calculating portion as shown in FIG. 20.
Figure 21:
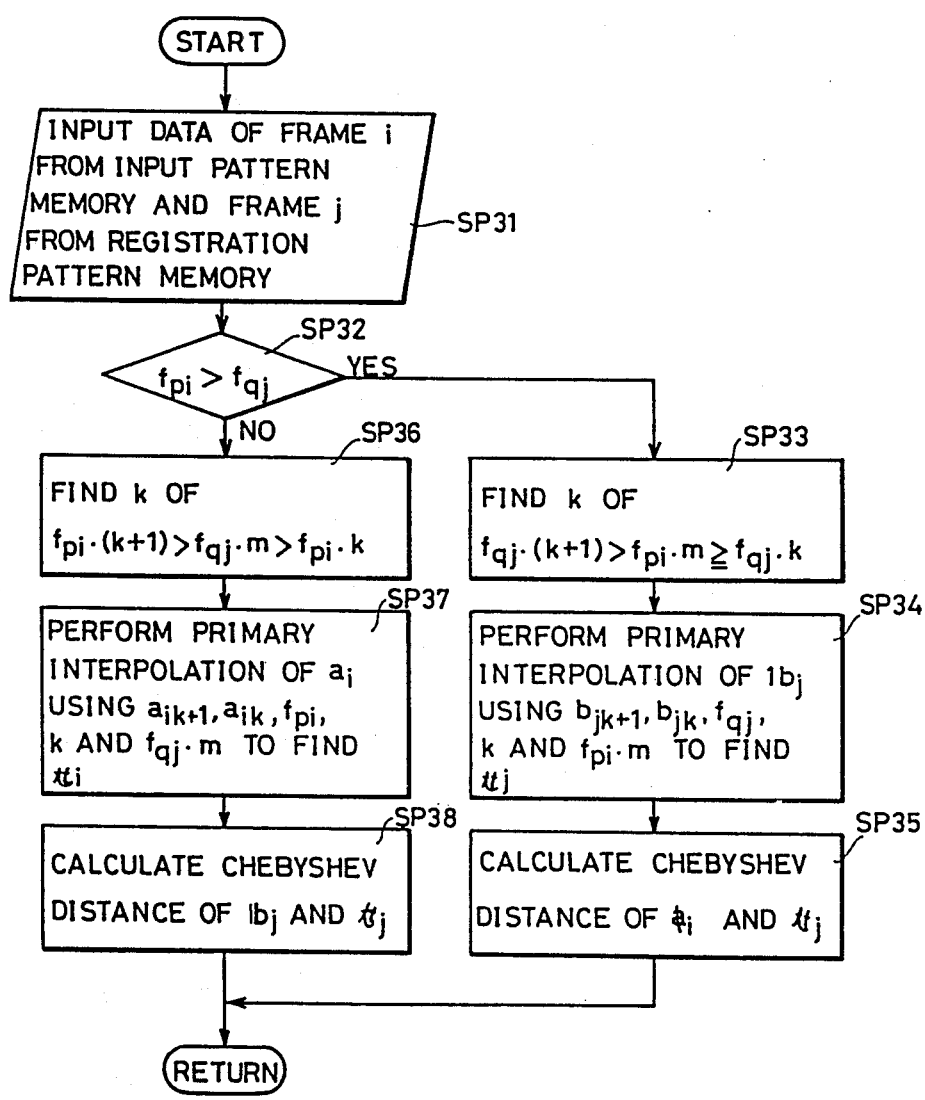
FIG. 21 is a flow diagram for explaining an operation of the distance calculating portion shown in FIG. 20.

FIGS. 21 and 22 are a flow chart of the distance calculating portion 51 in the embodiment as shown in FIG. 20 and an illustration showing interpolation of the spectrum patterns. Referring now to FIGS. 21 and 22, description is made on the operation of the embodiment as shown in FIG. 20, mainly with respect to the distance calculating portion 51. At a step SP31, the pitch frequency comparison circuit 517 receives a value $f_{pi}$ from an input pattern memory 3 as well as receiving a value $f_{qj}$ from a registration pattern memory 4, so as to compare the values at a step SP32 and supply the result of the comparison to the transfer switching circuit 518. When $f_{pi} \geq f_{qj}$, the transfer switching circuit 518 connects an input end a with an output end d while connecting an input end b with an output end c as shown in FIG. 20. When $f_{pi} < f_{qj}$ to the contrary, the transfer switching circuit 518 connects the input end a with the output end c while connecting the input end b with the output end d. The relation of $f_{pi} \geq f_{qj}$ is assumed here for the purpose of illustration. The spectrum pattern $a_i$ of the input pattern memory 3 is inputted in the parameter temporary storage memory 512, while the spectrum pattern $b_j$ of the registration pattern memory 4 is inputted with the values $f_{pi}$ and $f_{qj}$ in the primary interpolation circuit 512.

At a step SP33, an integral number k is found for comparison of spectrums at frequencies in an integral multiple of the value $f_{pi}$, the number k satisfying the following formula:

$$f_{qj} \cdot k \leq f_{pi} \cdot m < f_{qj} \cdot (k+1)) \qquad (19)$$

Then at a step SP34, linear primary interpolation is performed to calculate a spectrum $t_{jm}$ corresponding to a frequency $f_{pi} \cdot m$ using the values $b_{jk}$ and $b_{jk+1}$. The calculation by the above formula (19) and the linear primary interpolation are carried out from m=1 to Mb<M, in which Mb represents a value determined by an upper limit frequency $f_M$ on a frequency axis performing comparison of the spectrums. The primary interpolation circuit 512 finds $t_j=(t_{j1}, t_{j2}, \ldots, t_{jMb})$ by the aforementioned operation, to output the value to the parameter temporary storage memory 513. At a step SP35, a Chebyshev distance calculation circuit 516 calculates distances d(i, j) using the values $a_i$ and $t_j$ as follows:

$$d(i, j) = \sum_{m=1}^{Mb} |a_{jm} - t_{jm}| \quad (20)$$

Then a matching processing portion 52 performs matching processing using the obtained distances d(i, j).

Although the interpolation on the frequency axes is performed in compliance with the lower pitch frequency in the above embodiment, it may be performed in compliance with the higher pitch frequency.

Further, the interpolation may be performed either on the input pattern side or on the registration pattern side.

Since, according to each of the embodiments as shown in FIGS. 16 and 20 as described in the foregoing, there is provided a frequency normalizing means for extracting the spectrum patterns of the inputted aural signal to perform normalization on the frequency axes of the spectrum patterns, difference in phoneme can precisely be captured as a distance even if the voice waveform has significantly different pitch frequencies, thereby to improve the recognition capacity of the word speech recognition device.

In summary, "interpolation", as used herein refers to an interpolation of the spectrum data on the frequency axis. When performing pattern matching, a phoneme distance d(i, j) of a spectrum pattern between a frame i on the input pattern and a frame j on the template pattern is required. The distance between frames is described as:

$$d(i, j) = \sum_{n=1}^{N} |a_{in} - b_{jn}|$$

wherein, $a_{in}$ and $b_{in}$ are spectra of different frequencies, that is $A_i 1, A_i 2, \ldots, A_i N$ are spectra of frequencies of $f_{pi}, 2f_{pi}, \ldots, N \cdot f_{pi}$ respectively and $b_{ji}, \ldots, b_{jn}$ are spectra of frequencies $f_{pj} \ldots N \cdot f_{pj}$ respectively. Accordingly, when spectra of significantly different frequencies are compared based on pitch frequency, errors in distance result. To prevent such errors, spectrum data is interpolated on the frequency axis. Such interpolation can be implemented as explained, supra, or can be performed by a microcomputer and associated software.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A speech recognition apparatus operational in an environment having a large amplitude noise spectrum, comprising:
   audio signal input means for converting an input voice waveform to an audio signal;
   feature extracting means for extracting feature parameters of said audio signal;
   input pattern storing means for storing said feature parameters of speech to be recognized as extracted by said feature extracting means;
   registration pattern storing means having stored therein feature parameters of a plurality of speeches extracted by said feature extracting means; and
   speech recognition processing means for detecting any similarity between said feature parameters stored in said input pattern storing means and those stored in said registration pattern storing means;
   said feature extracting means comprising:
   pitch frequency detecting means for detecting a pitch frequency of said audio signal from said audio signal input means;
   a band-pass filter having a very narrow bandwidth and a resonance frequency dependent upon a filter coefficient thereof for extracting spectrum data of said audio signal to provide said feature parameters, and
   filter coefficient setting means responsive to the pitch frequency detected by said pitch frequency detecting means for setting the filter coefficient of said band-pass filter as an integral multiple of said pitch frequency.

2. A speech recognition apparatus in accordance with claim 1, wherein
   said band-pass filter is provided as a single unit, and
   said filter coefficient setting means includes means for setting said filter coefficient in said digital filter in time sharing manner, said digital band-pass filter constituting a group of channel filters in response to said filter coefficient set by said filter coefficient setting means.

3. A speech recognition apparatus in accordance with claim 1, wherein
   a plurality of said band-pass filters are provided in parallel, and
   said filter coefficient setting means includes means for setting different filter coefficients respectively of said parallel digital band-pass filters, said digital band-pass filters forming a group of channel filters in accordance with the filter coefficients therein set by said coefficient setting means.

4. A speech recognition apparatus in accordance with claim 1, wherein
   said band-pass filter further includes means for adjusting the level of said audio signal in response to a level thereof.

5. A speech recognition apparatus in accordance with claim 1, wherein
   said band-pass filter further includes means for adjusting an output signal level in response to a resonance frequency signal level to make an output signal level at the respective resonance frequencies constant.

6. A speech recognition apparatus in accordance with claim 1, wherein
   said band-pass filter includes:
   a primary differential circuit for receiving said audio signal from said audio signal input mans,
   a two-stage lattice-type filter for receiving the output from said primary differential circuit,
   a square-law circuit for receiving the output from said two-stage lattice-type filter, and
   an integrating circuit for receiving the output from said square-law circuit.

7. A speech recognition apparatus in accordance with claim 1, wherein
   said band-pass filter includes:
   a multiplier which receives said audio signal from said audio signal input means for multiplying said audio signal by a waveform multiplying coefficient, a primary differential circuit for receiving the output from said multiplier, a two-stage lattice-type filter for receiving the output from said primary differential circuit, a square-law circuit for receiving the output from said two-stage lattice-type filter, and an integrating circuit for receiving the output from said square-law circuit.

8. A speech recognition apparatus in accordance with claim 1, wherein said band-pass filter includes:

a primary differential circuit for receiving said audio signal from said audio signal input means, a two-stage lattice-type filter for receiving the output from said primary differential circuit, a square-law circuit for receiving the output from said two-stage lattice-type filter, an integrating circuit for receiving the output from said square-law circuit, and a multiplier for multiplying the output from said integrating circuit by a gain correction coefficient.

9. A speed recognition apparatus in accordance with claim 1, wherein said very narrow band width of said band-pass flter is less than 80 Hertz between points attenuated 3 db from a center frequency of said band-pass filter.

10. A speed recognition apparatus in accordance with claim 1, wherein said very narrow band width of said band-pass flter is less than 50 Hertz between points attenuated 3 db from a center frequency of said band-pass filter.

11. A speech recognition apparatus in accordance with claim 1, wherein said very narrow band width of sand band-pass filter is less than half of a pitch frequency of a vowel in human speech between points attenuated 3 db from a center frequency of said band-pass filter.

12. A speech recognition apparatus in accordance with claim 1, wherein said band-pass filter comprises a digital band-pass filter.

* * * * *